US012656445B2

(12) United States Patent
Fei et al.

(10) Patent No.: US 12,656,445 B2
(45) Date of Patent: Jun. 16, 2026

(54) INFORMATION GENERATION METHOD AND APPARATUS, AND INFORMATION USE METHOD AND APPARATUS

(71) Applicant: YINWANG INTELLIGENT TECHNOLOGIES CO., LTD., Shenzhen (CN)

(72) Inventors: Wenkai Fei, Beijing (CN); Jianqin Liu, Beijing (CN); Yong Wu, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 143 days.

(21) Appl. No.: 18/407,133

(22) Filed: Jan. 8, 2024

(65) Prior Publication Data

US 2024/0201312 A1     Jun. 20, 2024

Related U.S. Application Data

(63) Continuation of application No. PCT/CN2022/103712, filed on Jul. 4, 2022.

(30) Foreign Application Priority Data

Jul. 9, 2021     (CN) .......................... 202110780970.8

(51) Int. Cl.
*G01S 5/02*          (2010.01)
*G01S 5/14*          (2006.01)
*H04L 5/00*          (2006.01)

(52) U.S. Cl.
CPC ............. *G01S 5/0284* (2013.01); *G01S 5/14* (2013.01); *H04L 5/0053* (2013.01); *G01S 2205/002* (2013.01)

(58) Field of Classification Search
None
See application file for complete search history.

(56) References Cited

U.S. PATENT DOCUMENTS

| | | | | |
|---|---|---|---|---|
| 2003/0078720 A1* | 4/2003 | Adachi | ................. | G01C 21/30 |
| | | | | 701/446 |
| 2012/0095672 A1* | 4/2012 | Adachi | ................. | G01C 21/34 |
| | | | | 701/117 |

(Continued)

FOREIGN PATENT DOCUMENTS

| | | |
|---|---|---|
| EP | 1632750 A1 | 3/2006 |
| EP | 2625541 B1 | 3/2015 |

OTHER PUBLICATIONS

Extended European Search Report in European Appln. No. 22836870. 0, mailed Sep. 26, 2024, 9 pages.

(Continued)

*Primary Examiner* — Daniel L Greene
(74) *Attorney, Agent, or Firm* — Fish & Richardson P.C.

(57) ABSTRACT

The present disclosure relates to information generation apparatuses and methods and information use apparatuses and methods. An example method includes generating and sending first information, where the first information indicates a geographical area, a relative distance between a plurality of location points in a location point set in the geographical area, and at least one location point that belongs to the location point set, the at least one location point is for determining a location reference point.

30 Claims, 5 Drawing Sheets

200

(56)                    References Cited

U.S. PATENT DOCUMENTS

| | | | |
|---|---|---|---|
| 2012/0136623 A1 * | 5/2012 | Edge ..................... | G01S 5/0236 |
| | | | 702/150 |
| 2014/0082042 A1 * | 3/2014 | Johnson ................ | H04W 4/023 |
| | | | 709/201 |
| 2016/0313130 A1 * | 10/2016 | Baselau ............. | G01C 21/3811 |

OTHER PUBLICATIONS

International Search Report and Written Opinion in International Appln. No. PCT/CN2022/103712, mailed on Sep. 30, 2022, 21 pages (with English translation).

* cited by examiner

100

200

INFORMATION GENERATION METHOD AND APPARATUS, AND INFORMATION USE METHOD AND APPARATUS

CROSS-REFERENCE TO RELATED APPLICATIONS

This application is a continuation of International Application No. PCT/CN2022/103712, filed on Jul. 4, 2022, which claims priority to Chinese Patent Application No. 202110780970.8, filed on Jul. 9, 2021. The disclosures of the aforementioned applications are hereby incorporated by reference in their entireties.

TECHNICAL FIELD

This application relates to the field of intelligent vehicles and maps, and more specifically, to an information generation method and apparatus, and an information use method and apparatus.

BACKGROUND

With development of intelligent transportation system (ITS), there is a need for high-precision positioning. Roadside devices, the cloud, and vehicles may transmit and exchange location information based on a high precision map.

Currently, there are many map vendors of high precision maps with different drawing specifications and coding modes. Therefore, one position may have different expressions on maps provided by different map vendors, and location expressions have poor compatibility between the map vendors. In spite of an attempt to express locations through common reference points (CRPs), the map vendors may still be subject to a large error against one CRP on their maps due to the different drawing specifications and coding modes. How to provide a general method for the map vendors to realize high-precision location expressions has become an urgent technical problem to be resolved.

SUMMARY

Embodiments of this application provide an information generation method and apparatus, and an information use method and apparatus, to provide a general method for map vendors to implement high-precision location expressions.

According to a first aspect, this application provides an information generation method. The method may be performed by an information generation apparatus, or may be performed by a component (for example, a chip or a chip system) configured in the information generation apparatus; or may be implemented by a logical module or software that can implement all or some functions of the information generation apparatus. This is not limited in this application. For ease of understanding and description, the following uses interaction between the information generation apparatus and the information use apparatus as an example to describe the method provided in this application.

For example, the method includes: generating first information, where the first information indicates a geographical area, a relative location between a plurality of location points in a location point set in the geographical area, and at least one location point that belongs to the location point set, and the at least one location point is used to determine a location reference point; and sending the first information.

The location reference point is used for location reference on a map, and may be specifically used for relative reference for expressing a location on a first map. Specifically, a relative location of a target location point on the map relative to the location reference point may be used as a location of the target location point. The target location point may be a to-be-indicated location point. As an example rather than a limitation, the location point may be, for example, an anchor point (AP) in the map, and the location reference point may be, for example, a common reference point (CRP). This application includes but is not limited to what is described herein.

Based on the technical content, by indicating relative locations of a plurality of location points in a geographical area on a map, geometric matching may be performed on another map based on the relative locations of the plurality of location points, to obtain, on the another map, location points matching the plurality of location points. Further, the location reference point may be determined on the another map based on the at least one location point in the plurality of location points. Because each map vendor deploys location points on the map, and the location points are usually common map elements with fixed locations on the map, even if drawing specifications are different, an error introduced by the difference in the drawing specifications is small and precision is high. An expression of the subsequent target location point can also achieve high precision. Therefore, poor compatibility across map vendors is taken into account while high-precision positioning is realized.

With reference to the first aspect, in some possible implementations of the first aspect, the first information further includes at least one of the following content: information indicating a quantity of the plurality of location points; information indicating a type of a coordinate system on which the relative location is based; information indicating a type of each location point in the plurality of location points; information indicating location precision of each location point in the plurality of location points; information indicating a priority of each location point in the plurality of location points; information indicating a rule, where the rule is used to determine the location reference point based on the at least one location point; information indicating a version of the first information; information indicating an update time of the first information; information indicating whether location precision of at least some of the plurality of location points is reduced; information indicating whether location precision of the location reference point determined based on the at least one location point is reduced; and information indicating whether location precision of a target location point is reduced.

The coordinate system type includes a Cartesian coordinate system or a polar coordinate system. The Cartesian coordinate system includes, for example, but is not limited to, an East, North, Up (ENU) Cartesian coordinate system, or a North East Down (NED) Cartesian coordinate system. The polar coordinate system includes, for example, but is not limited to, an East, North, Up (ENU) polar coordinate system or a North East Down (NED) polar coordinate system. This application includes but is not limited to what is described herein.

The type of the location point may specifically include but is not limited to an intersection point, an end point, a change point, a vertex, or the like. The location points may include, for example, but are not limited to, left and right end points of a stop line of a turn waiting area, an intersection point between a stop line of a straight carriageway and a lane edge line, and a traffic sign plate location, for example, a traffic light location point or a signage location point. For brevity, details are not described herein.

The priority of the location point is related to the location precision of the location point. Higher location precision of the location point indicates a higher priority. Lower location precision of the location point indicates a lower priority.

The rule may be specifically a rule used to determine the location reference point based on the at least one location point. For example, the rule may be that one location point in the at least one location point is used as the location reference point, or may be a calculation manner of obtaining the location reference point through calculation based on a plurality of location points in the at least one location point.

The version of the first information may alternatively be understood as a version of the location point set or a version of the at least one location point. Because the location point set and the at least one location point may change, for example, may change with a location change of the information generation apparatus, the relative location between the plurality of location points in the location point set may be re-indicated based on the first information. In other words, if the version of the first information changes, it may indicate that the location point set changes, that is, a relative location of the at least one location point changes.

The update time of the first information may be a time at which the first information whose version changes is sent.

Whether the location precision of the location points in the plurality of location points is reduced is greatly related to whether the precision of the location reference point is reduced. The plurality of location points are used for geometric matching, and the location reference point is further determined by using the at least one of the location points. Therefore, when precision of one or more of the at least one location point used to determine the location reference point is reduced, precision of the location reference point may decrease.

In addition, the location precision of the target location point may also decrease because the location points in the location point set are not properly selected. For example, when the location points in the location point set are extremely concentrated or extremely scattered, and/or a geometric shape including the location points in the location point set is not particular, a geometric matching degree is low, and location precision of the target location point may decrease.

The information indicating whether the location precision is reduced can facilitate the information use apparatus to make a corresponding decision.

With reference to the first aspect, in some possible implementations of the first aspect, the method further includes: sending second information, where the second information indicates a location of a target location point relative to the location reference point.

After the location reference point is indicated, the location of the target location point relative to the location reference point may be further indicated, to accurately determine the target location point. Because the location reference point is determined with high precision, the target location point can also be determined with high precision.

With reference to the first aspect, in some possible implementations of the first aspect, the first information and the second information are carried in different messages. After the sending first information, the method further includes: receiving an acknowledgment message, where the acknowledgment message indicates that the first information is successfully received; and the sending second information includes sending the second information based on reception of the acknowledgment message.

The first information and the second information may be carried in different messages. For example, in a unicast scenario, the information generation apparatus may first send the first information, so that the information use apparatus determines the location reference point. The information use apparatus may send the acknowledgment message after successfully receiving the first information, and the information generation apparatus may send the second information after receiving the acknowledgment message, so that the information use apparatus determines the target location point. After receiving the message for the first information, the information generation apparatus may stop sending the first information, to reduce signaling overheads. It may be understood that, when the version of the first information is updated, a device receiving the first information changes, or the like, the information generation apparatus may send the first information again.

With reference to the first aspect, in some possible implementations of the first aspect, the first information and the second information are carried in a same message.

The first information and the second information may be carried in a same message. For example, in a multicast scenario, the information generation apparatus may send the message in a broadcast or multicast form. Each information use apparatus that receives the message may determine the target location point based on the first information and the second information that are carried in the message.

With reference to the first aspect, in some possible implementations of the first aspect, the first information is periodically repeated information.

The information generation apparatus may periodically and repeatedly send the first information, to send the first information of the latest version. In addition, when the information use apparatus is a mobile device, each information use apparatus determines the location reference point based on the first information of the latest version.

With reference to the first aspect, in some possible implementations of the first aspect, the plurality of location points are location points related to a map element in a map, and the plurality of location points are determined based on at least one of the following content: location precision of the plurality of location points, and geometric distribution of the plurality of location points.

The map elements include, for example, but is not limited to, a roadside device, a building, or a traffic sign line. The location points are related to the map elements. For example, the location point may be an intersection point between traffic sign lines, for example, an intersection point between a lane edge line and a stop line. The location point may alternatively be a location point or a central location point of a roadside device, for example, a location point of a roadside unit, a central location point of a traffic light frame, or a central location point of a traffic indication sign.

When the plurality of location points in the first location point set are determined, a location point with high location precision may be preferably selected.

Because the location point with high location precision is selected as a location point in the first location point set, subsequent geometric matching is performed based on high location precision. This helps to obtain a location reference point with high location precision, so that an expression of the target location point also has high location precision. Therefore, a location point with high location precision has a high priority, and a location point with low location precision has a low priority.

In addition, when the plurality of location points in the first location point set are determined, the plurality of location points should meet the following requirements: distribution cannot be extremely scattered or extremely centralized, and a geometric shape including the plurality of location points is particular.

Specifically, centralized or dispersed distribution of the plurality of location points may be determined by a relative distance between the plurality of location points. For example, a distance interval may be set, and a distance between any two location points in the plurality of location points needs to fall within a range of the distance interval. For example, if the distance interval is [d1, d2], where d2>d1>0, it indicates that the distance d of the any two location points in the plurality of location points should meet: d1≤d≤d2.

The geometric shape including the plurality of location points is specifically a closed geometric shape including combining lines of every two adjacent location points in the plurality of location points. The geometric shape of the plurality of location points needs to be particular, for ease of distinguishing from other location points. If the geometric shape including the plurality of location points is not particular, a second location point set matched when geometric matching is performed on a second map may not be a location point set corresponding to a location of the first location point set on the first map. As a result, a subsequent location reference point is also inaccurately determined. This is unfavorable to a high-precision location expression of the target location point.

With reference to the first aspect, in some possible implementations of the first aspect, the location point set belongs to a first map, the location reference point is a relative reference for expressing a location on a second map, and the second map is different from the first map.

The first map is different from the second map, in other words, the first map and the second map may come from different map vendors. In other words, the first map and the second map may have a difference in drawing specifications and/or a difference in location point definitions. The first information indicates a relative location between a plurality of location points in a location point set in a geographical area on the first map, so that geometric matching can be performed on the second map based on the relative location, and a plurality of corresponding location points are determined on the second map. Further, a location reference point may be determined based on at least one of the location points. Thus, a cross-map vendor indication of the location reference point is realized.

It should be understood that the method may also be applied to an indication of a location reference point between two maps of a same map vendor. An application scope of the method is not limited in this application.

According to a second aspect, this application provides an information use method. The method may be performed by an information use apparatus, or may be performed by a component (for example, a chip or a chip system) configured in the information use apparatus; or may be implemented by a logical module or software that can implement all or some functions of the information use apparatus. This is not limited in this application. For ease of understanding and description, the following uses interaction between the information generation apparatus and the information use apparatus as an example to describe the method provided in this application.

For example, the method includes: receiving first information, where the first information indicates a geographical area, a relative location between a plurality of location points in a first location point set in the geographical area on a first map, and a first at least one location point that belongs to the first location point set; and determining a location reference point based on the first information.

The location reference point is used for location reference on a map. Specifically, a relative location of a target location point on the map relative to the location reference point may be used as a location of the target location point. The target location point may be a to-be-indicated location point. By way of example, and not limitation, the location point may be, for example, an AP on the map, and the location reference point may be, for example, a CRP. This application includes but is not limited to what is described herein.

It should be noted that, for ease of distinguishing from the "second location point set" on the second map described below, the location point set on the first map is denoted as the "first location point set" herein. A meaning and a scope expressed by the "first location point set" are the same as those expressed by the "location point set" in the first aspect. The "first location point set" is a set of location points used for geometric matching on the first map. Correspondingly, for ease of distinguishing from the "second at least one location point" and the "third at least one location point" on the second map described below, the at least one location point in the location point set on the first map is denoted as the "first at least one location point". A meaning and a scope expressed by the "first at least one location point" are the same as those expressed by the "at least one location point" in the first aspect. The "first at least one location point" is a location point used to determine the location reference point on the first map.

It should be understood that the first at least one location point is a subset in the first location point set. In other words, the first location point set includes the first at least one location point.

Based on the foregoing technical content, geometric matching is performed on the second map based on the relative location between the plurality of location points in the first location point set on the first map, so that the second at least one location point that matches the plurality of location points may be obtained on the second map. Therefore, the third at least one location point may be determined on the second map, and the location reference point may be further determined by using the third at least one location point. Because each map vendor deploys location points on the map, and the location points are usually common map elements with fixed locations on the map, even if drawing specifications are different, an error introduced by the difference in the drawing specifications is small and precision is high. An expression of the subsequent target location point can also achieve high precision. Therefore, poor compatibility across map vendors is taken into account while high-precision positioning is realized.

With reference to the second aspect, in some possible implementations of the second aspect, the first information further includes at least one of the following content: information indicating a quantity of the plurality of location points; information indicating a type of a coordinate system on which the relative location is based; information indicating a type of each location point in the plurality of location points; information indicating location precision of each location point in the plurality of location points; information indicating a priority of each location point in the plurality of location points; information indicating a rule, where the rule is used to determine the location reference point based on the at least one location point; information indicating a version of the first information; information indicating an update time of the first information; information indicating whether location precision of at least some of the plurality of location points is reduced; information indicating whether location precision of the location reference point determined based on the at least one location point is reduced; and information indicating whether location precision of a target location point is reduced.

It should be noted that, for ease of distinguishing from the "second rule" described below, a rule used to determine the location reference point based on the first at least one location point in the first location point set is denoted as a "first rule" herein. A meaning and a scope expressed by the "first rule" are the same as those expressed by the "rule" in the first aspect. The "first rule" is used to determine the location reference point based on the first at least one location point.

It should be understood that for a description of each piece of content included in the first information, refer to the related description in the first aspect. For brevity, details are not described herein.

With reference to the second aspect, in some possible implementations of the second aspect, the determining a location reference point based on the first information includes: determining, based on update indication information included in the first information, that the location reference point is not updated; and determining a currently stored location reference point as the location reference point.

Version update information of the first information may include, for example, but is not limited to, version information, a time stamp, or an update indication flag bit. The version update information of the first information may indicate whether the most recently received first information is updated compared with the previously received first information.

Whether the first information is updated may be used to determine whether the currently stored location reference point is updated. If the first information is not updated, the currently stored location reference point may continue to be used. Therefore, repeated calculation of the same location reference point can be reduced. If the first information is updated, the location reference point may be re-determined based on the most recently received first information. Therefore, an incorrect location reference point is not used to determine the target location point.

With reference to the second aspect, in some possible implementations of the second aspect, the determining a location reference point based on the first information includes: obtaining a second location point set in the geographical area on a second map, where the second location point set includes a second at least one location point, and the second at least one location point geometrically matches at least a part of the first at least one location point; determining a third at least one location point based on information that is in the first information and that indicates the first at least one location point, where at least a part of the third at least one location point belongs to the second at least one location point; and determining the location reference point according to the first rule and the third at least one location point, where the location reference point is a relative reference for expressing a location on the second map, and the second map is different from the first map.

The geometric matching may specifically mean that, based on geometric distribution of the plurality of location points in the first location point set on the first map, the second location point set that has a same or similar geometric distribution is sought from the second map. The geometric distribution here is determined by a distance and distribution direction relationship between the plurality of location points. The second location point set determined after geometric matching may include a second at least one location point, and the second at least one location point may match all location points in the first location point set, or may match at least some location points.

The third at least one location point is a location point used to determine the location reference point on the second map. The third at least one location point may be determined based on information that is in the first information and that indicates the first at least one location point. The third at least one location point may be a subset of the second at least one location point, or may include a virtual location point other than the second at least one location point. Herein, the virtual location point refers to a location point that is not marked on the second map but matches the first at least one location point. The virtual location point may be obtained through calculation based on a relative location relationship of the first at least one location point.

For example, if the second at least one location point is in a one-to-one correspondence with the first at least one location point in the first location point set, the third at least one location point is a subset of the second at least one location point. If the second at least one location point partially corresponds to the first at least one location point in the first location point set, that is, matching location points are not found on the second map for some location points in the first at least one location point, the third at least one location point may further include a virtual location point other than the second at least one location point. For example, if the first rule is that a location point in the first location point set is used as a location reference point, that is, the first at least one location point is one location point, and if there is a matching location point for the location point on the second map, a virtual location point does not need to be determined. The third at least one location point is the second at least one location point. On the contrary, if there is no matching location point for the location point on the second map, the virtual location point needs to be determined, and the third at least one location point further includes the virtual location point. For another example, if the first rule is that a location reference point is determined based on the first at least one location point in the first location point set by using a predefined calculation method, and the obtained third at least one location point cannot be in a one-to-one correspondence with the first at least one location point, a virtual location point needs to be determined, and the third at least one location point includes the virtual location point.

A rule for determining the virtual location point is as follows: For example, if a location point A in the first at least one location point does not have a matching location point on the second map, a calculation method for the location point A may be determined based on a relative relationship between a location point near the location point A and the location point A in the first location point set. In other words, a location of the location point A is expressed by using another location point in the first location set, for example, a relative location of the location point A relative to each location point is calculated, or a relative location of the location point A relative to a center of gravity of the another location point is calculated. A matching location point can be found on the second map for the location point used to express the location point A. According to the method, the virtual location point matching the location point A may be determined on the second map. The rule is also a rule used to determine the virtual location point.

With reference to the second aspect, in some possible implementations of the second aspect, the third at least one location point includes a virtual location point, and the virtual location point is obtained based on a relative location between the at least a part of the third at least one location point and the plurality of location points.

As described above, the virtual location point may be a location point that is not marked on the second map but may be obtained based on the relative location between the at least a part of the third at least one location point and the plurality of location points. The virtual location point is determined mainly to find a location point matching the first at least one location point, and further determine the location reference point on the second map.

With reference to the second aspect, in some possible implementations of the second aspect, the obtaining a second location point set in the geographical area on a second map includes: obtaining a plurality of candidate location points in the geographical area on the second map based on the information that is in the first information and that indicates the type of each location point in the plurality of location points; and determining the second location point set from the plurality of candidate location points based on relative location between the plurality of location points in the first location point set.

Based on the types of the plurality of location points in the first location point set that are indicated in the first information, a location point of a same type may be first filtered out from the geographical area on the second map, and a location point of another type may be filtered out. The location point that is found in the geographical area on the second map and that is of the same type as the plurality of location points in the first location point set may be recorded as a candidate location point. It should be understood that that the location point has the same type as the plurality of location points in the first location point set does not mean that the plurality of location points in the first location point set are location points of a same type. When the plurality of location points in the first location point set have a plurality of types, a plurality of location points of the types may be found in the geographical area on the second map as candidate location points.

After the candidate location points are obtained through type screening, the information use apparatus may perform geometric matching based on the plurality of candidate location points, and does not need to perform geometric matching at all location points in the geographical area of the second map. Therefore, geometric matching complexity can be reduced, and the second location point set can be quickly matched.

With reference to the second aspect, in some possible implementations of the second aspect, the selecting the second location point set from the plurality of candidate location points includes: selecting, from the plurality of candidate location points, a location point whose location precision is higher than a threshold or whose priority is higher than a threshold as a location point in the second location point set.

In a process of performing geometric matching, some location points on the second map may have good degrees of matching with some location points in the first at least one location point, or some location points may have poor degrees of matching with some location points in the first at least one location point. In this case, a location point with high location precision and/or a high priority may be preferably matched, and a location point with low location precision and/or a low priority may be secondly matched.

High or low location precision and a high or low priority may be respectively measured by using different thresholds. For example, location precision corresponds to a first threshold. If a precision level is higher than the first threshold, it is considered that the location precision is high. A priority corresponds to a second threshold. If a priority is higher than the second threshold, it is considered that the priority is high. It should be understood that the first threshold and the second threshold may be independent of each other.

It should be further understood that a location point whose location precision is higher than the threshold or whose priority is higher than the threshold is selected from the plurality of candidate location points as a location point in the second location point set. It does not mean that the information use apparatus may select only the location point whose location precision is higher than the threshold or whose priority is higher than the threshold as the location point in the second location point set. For example, when no location point whose location precision is higher than the threshold or whose priority is higher than the threshold can match the location point in the first location point set, the information use apparatus may alternatively select a location point whose location precision is lower than or equal to the first threshold, or a location point whose priority is lower than or equal to the second threshold as a location point in the second location point set. In other words, the information use apparatus may preferably select, from the plurality of candidate location points, a location point whose location precision is higher than the threshold or whose priority is higher than the threshold as the location point in the second location point set.

With reference to the second aspect, in some possible implementations of the second aspect, the determining a location reference point based on the first information includes: determining a location and confidence of the location reference point based on the first information, where the confidence is related to at least a geometric matching degree, and the geometric matching degree is a degree of geometric matching between the first at least one location point and the second at least one location point.

The geometric matching degree may be understood as a degree of matching with the plurality of location points in the first location point set. More location points matched with the plurality of location points in the first location point set, and a high degree of overlap between the matched location points indicate a higher geometric matching degree. Therefore, the location reference point determined thereby has higher precision and confidence.

On the contrary, if fewer location points in the geographical area on the second map match the plurality of location points in the first location point set, and/or if a degree of overlap between the location points in the geographical area on the second map and the plurality of matched location points in the first location point set is lower, it indicates that the geometric matching degree is lower, and precision of the location reference point determined thereby is affected. Therefore, the confidence is lower.

With reference to the second aspect, in some possible implementations of the second aspect, the determining the location reference point according to the first rule and the third at least one location point includes: optimizing a location point in the third at least one location point according to a second rule, to obtain a fourth at least one location point; and determining the location reference point according to the first rule and the fourth at least one location point.

Because map vendors may have different drawing specifications and location point definitions, a degree of matching between the third at least one location point and the first at least one location point may not be high. Therefore, the information use apparatus may determine whether error compensation is involved according to the second rule. Under the second rule, if coordinate offset of two matched location points on the first map and the second map are greater than or equal to a first preset threshold, error compensation needs to be performed. Conversely, error compensation is not involved. For example, the second rule may determine whether to perform error compensation from an angle of an error level. The third at least one location point may be optimized through error compensation, and the location reference point determined thereby has high location precision.

It should be understood that optimizing the location points in the third at least one location point may be optimizing all location points in the third at least one location point, or may be optimizing some location points. This is not limited in this application. However, it should be noted that the fourth at least one location point is specifically all of the third at least one location point obtained after optimization, and is not limited to an optimized location point. In other words, determining the location reference point according to the first rule and the fourth at least one location point may mean determining the location reference point according to the first rule and the third at least one location point obtained after optimization.

With reference to the second aspect, in some possible implementations of the second aspect, the determining a location reference point based on the first information includes: determining that the version of the first information is updated; and determining the location reference point based on the first information.

As described above, whether the version of the first information is updated may be determined by using version information, a time stamp, an update indication flag bit, or the like included in the first information. Version update of the first information means update of the location reference point. Therefore, the first at least one location point needs to be re-determined based on most recently received first information, and then the location reference point needs to be determined based on the first at least one location point. It may be understood that if the version of the first information is not updated, the step of determining the location reference point based on the first information may not be performed.

With reference to the second aspect, in some possible implementations of the second aspect, the method further includes: receiving second information, where the second information indicates a location of the target location point relative to the location reference point; and determining the location of the target location point based on the location reference point and the second information.

After the location reference point is determined, the target location point may be further determined based on the second information. Because the location reference point is determined with high precision, the target location point can also be determined with high precision.

With reference to the second aspect, in some possible implementations of the second aspect, after the receiving first information, the method further includes: sending an acknowledgment message, where the acknowledgment message indicates that the first information is successfully received.

After the first information is successfully received, the acknowledgment message is sent to indicate that the first information is successfully received, so that the information generation apparatus can make a decision on whether the first information needs to be retransmitted, and repeated sending of the same first information by the information generation apparatus can be avoided, thereby reducing signaling overheads.

According to a third aspect, this application provides an information generation apparatus, including a module or a unit configured to implement the method in any one of the first aspect and the possible implementations of the first aspect. It should be understood that each module or unit may implement a corresponding function by executing a computer program.

According to a fourth aspect, this application provides an information generation apparatus, including a processor, where the processor is configured to perform the information generation method according to any one of the first aspect or the possible implementations of the first aspect.

The apparatus may further include a memory, configured to store instructions and data. The memory is coupled to the processor, and when executing the instructions stored in the memory, the processor can implement the method described in the aspects. The apparatus may further include a communication interface. The communication interface is used by the apparatus to communicate with another device. For example, the communication interface may be a transceiver, a circuit, a bus, a module, or another type of communication interface.

It should be understood that the information generation apparatuses in the third aspect and the fourth aspect may be a cloud device, a roadside device, or a terminal device, where the cloud device is, for example, a map server, a software module, a hardware module, a chip, or a chip system in the map server. The roadside device is, for example, a roadside unit, a software module, a hardware module, a chip, or a chip system in the roadside unit. The terminal device is, for example, a vehicle, a software module, a hardware module, a chip, or a chip system in the vehicle. This application includes but is not limited to what is described herein.

According to a fifth aspect, this application provides an information use apparatus, including a module or a unit configured to implement the method in any one of the second aspect or the possible implementations of the second aspect. It should be understood that each module or unit may implement a corresponding function by executing a computer program.

According to a sixth aspect, this application provides an information use apparatus, including a processor, where the processor is configured to perform the information use method according to any one of the second aspect or the possible implementations of the second aspect.

The apparatus may further include a memory, configured to store instructions and data. The memory is coupled to the processor, and when executing the instructions stored in the memory, the processor can implement the method described in the foregoing aspects. The apparatus may further include a communication interface. The communication interface is used by the apparatus to communicate with another device. For example, the communication interface may be a transceiver, a circuit, a bus, a module, or another type of communication interface.

It should be understood that the information use apparatuses in the fifth aspect and the sixth aspect may be a cloud device, a roadside device, or a terminal device, where the cloud device is, for example, a map server, a software module, a hardware module, a chip, or a chip system in the map server. The roadside device is, for example, a roadside unit, a software module, a hardware module, a chip, or a chip system in the roadside unit. The terminal device is, for example, a vehicle, a software module, a hardware module, a chip, or a chip system in the vehicle. This application includes but is not limited to what is described herein.

According to a seventh aspect, this application provides a chip system. The chip system includes at least one processor, configured to support implementation of the functions in any one of the first aspect or the second aspect and the possible implementations of the first aspect or the second aspect, for example, receiving or processing data and/or information involved in the foregoing methods.

In a possible design, the chip system further includes a memory, the memory is configured to store program instructions and data, and the memory is located inside or outside the processor.

The chip system may include a chip, or may include a chip and another discrete component.

According to an eighth aspect, an embodiment of this application provides a communication system, including the foregoing information generation apparatus and information use apparatus.

According to a ninth aspect, this application provides a computer-readable storage medium, including a computer program. When the computer program is run on a computer, the computer is enabled to implement the method according to any one of the first aspect or the second aspect and the possible implementations of the first aspect or the second aspect.

According to a tenth aspect, this application provides a computer program product. The computer program product includes a computer program (also referred to as code or instructions). When the computer program is run, a computer is enabled to perform the method according to any one of the first aspect or the second aspect and the possible implementations of the first aspect or the second aspect.

According to an eleventh aspect, this application provides a map, where the map includes first information, the first information indicates a geographical area, a relative location between a plurality of location points in a location point set in the geographical area, and at least one location point that belongs to the location point set, and the at least one location point is used to determine a location reference point.

With reference to the eleventh aspect, in some possible implementations of the eleventh aspect, the first information further includes at least one of the following content: information indicating a quantity of the plurality of location points; information indicating a type of a coordinate system on which the relative location is based; information indicating a type of each location point in the plurality of location points; information indicating location precision of each location point in the plurality of location points; information indicating a priority of each location point in the plurality of location points; information indicating a rule, where the rule is used to determine the location reference point based on the at least one location point; information indicating a version of the first information; information indicating an update time of the first information; information indicating whether location precision of at least some of the plurality of location points is reduced; information indicating whether location precision of the location reference point determined based on the at least one location point is reduced; information indicating whether location precision of a target location point is reduced; and information indicating whether location precision of the location reference point determined based on the at least one location point is reduced.

With reference to the eleventh aspect, in some possible implementations of the eleventh aspect, the map further includes second information, and the second information indicates a location of the target location point relative to the location reference point.

According to a twelfth aspect, this application provides a computer-readable storage medium, where the computer-readable storage medium stores the map according to any one of the eleventh aspect or the possible implementations of the eleventh aspect.

It should be understood that technical solutions of the third to the twelfth aspects of this application are consistent with technical solutions of the first aspect or the second aspect of this application, and advantageous effects achieved by the aspects and the corresponding feasible implementations are similar. Details are not described again.

DESCRIPTION OF EMBODIMENTS

The following describes technical solutions of this application with reference to accompanying drawings.

The technical solutions provided in this application may be applied to an intelligent transportation system, which is also referred to as an intelligent transportation system. The intelligent transportation system effectively applies an information technology, a data communication technology, a sensor technology and artificial intelligence to transportation and service control. This can effectively improve safety and efficiency of transportation.

Figure 1:
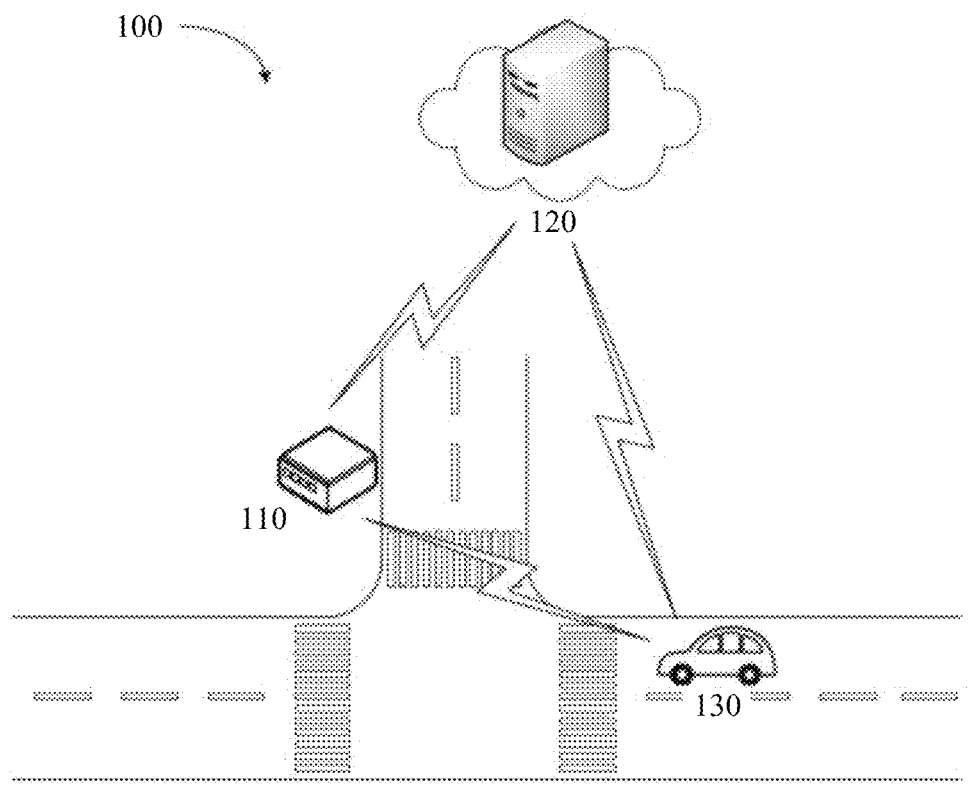
FIG. 1 is a schematic diagram of a system for a location indication method and a location determining method according to an embodiment of this application.

FIG. 1 is a schematic diagram of a system applicable to a location indication method and a location determining method according to an embodiment of this application. As shown in FIG. 1, the system 100 includes a roadside device 110, a cloud device 120, and a terminal device 130. The roadside device 110 may include but is not limited to a roadside unit (RSU). The cloud device 120 may specifically refer to a cloud server, for example, a map server. The terminal device 130 may specifically include a vehicle.

In the system 100 shown in FIG. 1, the roadside device 110, the cloud device 120, and the terminal device 130 all locally carry high precision maps, and map vendors of the high precision maps carried by the roadside device 110, the cloud device 120, and the terminal device 130 may be the same or different. This is not limited in embodiments of this application.

Although FIG. 1 shows only one roadside device 110, one cloud device 120, and one terminal device 130, it should be understood that quantities of roadside devices 110, cloud devices 120, and terminal devices 130 are not limited in embodiments of this application. The system 100 may further include more roadside devices, cloud devices, and terminal devices, and location information transmission and exchange can be implemented between any two devices.

For example, the roadside device may send location information of a dynamic event to the cloud device, or may send location information of a dynamic event to the terminal device, or may send location information of a dynamic event to the terminal device by using the cloud device. For another example, the terminal device may send location information of a dynamic event to the roadside device, or may send location information of a dynamic event to the cloud device, or may send location information of a dynamic event to the roadside device by using the cloud device. For another example, location information of a dynamic event may alternatively be sent to each other between terminal devices, between cloud devices, or between roadside devices. For brevity, examples are not listed one by one herein.

The dynamic event may specifically refer to an event that is identified by a device (for example, a roadside device or a terminal device) within a field of view of the device, for example, within a range that can be photographed by a camera, and that needs to be reminded of. For example, the dynamic event includes but is not limited to: a traffic accident, road maintenance, pedestrian walking, or vehicle congestion. The identification of the dynamic event may be implemented, for example, by using an artificial intelligence (AI) technology. For brevity, details are not described herein.

It should be understood that communication between devices may be performed by using, for example, a new radio access technology (NR) or machine type communication (MTC) in a fifth generation (5G) mobile communication system, long term evolution-machine (LTE-M), a communication technology in a device-to-device (D2D) network, a machine-to-machine (M2M) network, an internet of things (IoT), or other network. Communication manners in an internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, or vehicle to network (V2N) communication. This application includes but is not limited to what is described herein.

As mentioned above, drawing specifications and coding modes of high precision maps are different from each other, and compatibility of a location expression across map vendors is poor. For example, the roadside device may send ambient environment information to the terminal device, for example, including ambient vehicle motion information, a traffic event, and a collaborative driving reminder. A high-precision location of each piece of dynamic information needs to be expressed. However, a high precision map used by each terminal device may be different from that used by the roadside device. Therefore, a location expression needs to be compatible across map vendors.

In view of this, this application provides an information generation method and an information use method, to locate a location reference point by using a location point that has been deployed on a map. Because each map vendor deploys location points on the map, and the location points are usually common elements with fixed locations on the map, even if drawing specifications are different, an error introduced by the difference in the drawing specifications is small. In this way, the location reference point is positioned, and a positioning error of the location reference point may be controlled within a small range, so that a large deviation does not occur on a positioned target location point. In addition, in a process of positioning the location reference point by using at least one location point, geometric matching of the plurality of location points is performed on two maps based on a relative location relationship between the plurality of location points in a location point set, so that positioning of the location reference point is universal among the plurality of map vendors. The location reference point determined based on this has a small error on the map of each map vendor, and an expression of the subsequent target location point can also achieve high precision. Therefore, the methods are a general information generation method and information use method for realizing high precision positioning and taking into account poor compatibility across map vendors.

The following describes in detail the information generation method and the information use method provided in embodiments of this application with reference to the accompanying drawings.

To facilitate understanding of the following embodiments, the following descriptions are first made.

First, for ease of distinguishing and understanding, the following definition is made: An information generation apparatus carries a first map, and an information use apparatus carries a second map. The first map and the second map may come from a same map vendor, or may come from different map vendors. This is not limited in embodiments of this application. A location point used for location point matching on the first map is referred to as a first location point set, location points that can match the first location point set on the second map are referred to as a second location point set, and a location point in the second location point set is referred to as a second at least one location point. A location point used to express a location of the location reference point on the first map is referred to as a first at least one location point, and the first at least one location point is a subset of the first location point set. A location point used to calculate a location reference point on the second map is referred to as a third at least one location point.

Second, "sending" in embodiments of this application may be performed between devices, for example, may be performed between different cloud devices, may be performed between different terminal devices, or may be performed between different roadside devices. Alternatively, "sending" in embodiments of this application may be performed between a cloud device and a terminal device, may be performed between a cloud device and a roadside device, or may be performed between a terminal device and a roadside device. For another example, "sending" in embodiments of this application may be performed in a device, for example, may be performed between components, modules, chips, software modules, or hardware modules in the device through a bus, a cab, or an interface. For example, map sending may be performed in a same cloud device, may be performed in a same terminal device, or may be performed in a same roadside device.

"receiving" in embodiments of this application may be performed between devices, for example, may be performed between different cloud devices, may be performed between different terminal devices, or may be performed between different roadside devices. Alternatively, "receiving" in embodiments of this application may be performed between a cloud device and a terminal device, may be performed between a cloud device and a roadside device, or may be performed between a terminal device and a roadside device. For another example, "receiving" in embodiments of this application may be performed in a device, for example, performed between components, modules, chips, software modules, or hardware modules in the device through a bus, a cab, or an interface. For example, map receiving may be performed in a same cloud device, may be performed in a same terminal device, or may be performed in a same roadside device.

Third, in embodiment of this application, prefix words such as "first" and "second" are used only for distinguishing and describing different things belonging to a same name category, and a sequence or a quantity of things is not restricted. For example, "first information" and "second information" are merely information of different content or uses, and there is no time sequence relationship or priority relationship between the two. The first information may be one piece of information or more pieces of information, and the second information may be one piece of information or more pieces of information.

Fourth, in embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent a, b, c, a and b, a and c, b and c, or a, b, and c. a, b, and c each may be singular or plural.

Fifth, it may be understood that, in embodiments of this application, "when" and "if" both mean that the apparatus performs corresponding processing in an objective situation, are not intended to limit time, do not require the apparatus to necessarily have a determining action during implementation, and do not mean other limitation.

Sixth, "at the same time" in embodiment of this application may be understood as being at a same time point, or may be understood as being in a time period, or may be understood as being in a same period, and may be specifically understood with reference to a context.

Figure 2:
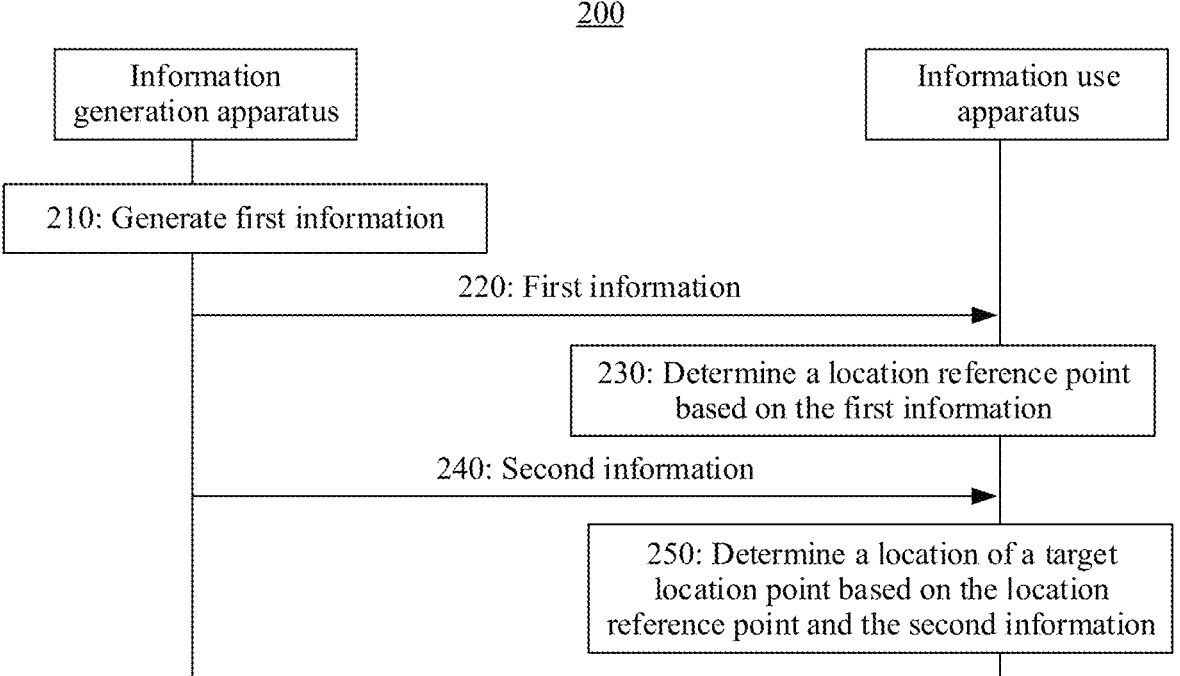
FIG. 2 is a schematic flowchart of an information generation method and an information use method according to an embodiment of this application.

FIG. 2 is a schematic flowchart of an information generation method and an information use method according to an embodiment of this application. The flowchart shown in FIG. 2 describes the method from a perspective of device interaction. In the embodiment shown in FIG. 2, an information generation apparatus and an information use apparatus may be, for example, any one of a roadside device, a cloud device, or a terminal device in the system 100 shown in FIG. 1. The cloud device is, for example, a map server, a software module, a hardware module, a chip, or a chip system in the map server. The roadside device is, for example, a roadside unit, a software module, a hardware module, a chip, or a chip system in the roadside unit. The terminal device is, for example, a vehicle, a software module, a hardware module, a chip, or a chip system in the vehicle. This application includes but is not limited to what is described herein.

The method 200 shown in FIG. 2 includes steps 210 to 250. Step 210, step 220, and step 240 mainly describe the information generation method executed by the information generation apparatus, and step 220, step 230, and step 250 mainly describe the information use method executed by the information use apparatus. The following describes in detail the steps in the method 200 shown in FIG. 2.

In step 210, the information generation apparatus generates first information, where the first information indicates a geographical area, a relative location between a plurality of location points in a first location point set in the geographical area, and a first at least one location point that belongs to the location point set, and the first at least one location point is used to determine a location reference point.

The first location point set includes a plurality of location points, and the plurality of location points are location points in a geographical area on a first map. A quantity of location points in the first location point set may be a quantity of all location points in the geographical area, or may be a quantity of some location points in the geographical area. A person skilled in the art may set the quantity of location points in the first location point set according to an actual requirement. The first at least one location point in the first location point set is related to the location reference point.

Optionally, the first location point set belongs to the first map, and the location reference point may be used as a relative reference for expressing a location on a second map in the information use apparatus, where the second map is different from the first map.

The first map is different from the second map, in other words, the first map and the second map may come from different map vendors. In other words, the first map and the second map may have a difference in drawing specifications and/or a difference in location point definitions. The first information indicates a relative location between a plurality of location points in a location point set in a geographical area on the first map, so that geometric matching can be performed on the second map based on the relative location, and a plurality of corresponding location points are determined on the second map. Further, a location reference point may be determined based on at least one of the location points. Thus, a cross-map vendor indication of the location reference point is realized.

It should be understood that the information generation method and the information use method provided in embodiments of this application may also be applied to an expression of a location reference point between two maps of a same map vendor. An application scope of the method is not limited in this application.

The following describes in detail a process of determining the geographical area, the first location point set, and the first at least one location point in the first information, and a process of generating the first information based on the determined geographical location, the first location point set, and the first at least one location point.

The location reference point may be determined by using the first at least one location point in the first location point set. For example, the location reference point may be a location point in the first location point set, or may be obtained by using the at least one location point in the first location point set through calculation according to a predefined calculation rule. For example, the location reference point is a center of gravity of a geometric image including a plurality of location points in the first location point set; or is a point obtained after a location point in the first location point set deviates from the preset direction by a preset distance. For brevity, details are not described herein.

It should be noted that the location reference point may be determined by using the at least one location point, and this does not mean that the location reference point is determined based on determining the at least one location point. The following provides two examples of possible cases.

In a possible case, the information generation apparatus may determine one or more geographical areas around the information generation apparatus, determine the first location point set from location points in each geographical area, further determine the first at least one location point from the first location point set, and obtain the location reference point through calculation by using the first at least one location point according to the predefined calculation rule.

The geographical area may be determined in a plurality of possible manners. For example, a location may be preselected as a preselected point, and a circular geographical area may be determined by using the preselected point as a circle center and using a preset value as a search radius. For another example, a road section may be selected as the geographical area. For another example, a crossroad is used as the geographical area. For brevity, details are not described herein. An outer contour of the geographical area is not limited in embodiments of this application.

In another possible case, the information generation apparatus may first determine a location reference point, and then search around the location reference point for a location point that can accurately express a location of the location reference point as the first at least one location point. For example, the location reference point may be determined based on a location of a dynamic event (namely, a target location that needs to be expressed). For example, the location reference point is set near the location of the dynamic event. In this implementation, the location reference point may be determined first, then the first at least one location point is determined, and then the first location point set is determined, so that the first at least one location point all falls within a range of the first location point set. Then, the geographical area is determined based on locations of a plurality of location points in the first location point set.

The determining of the geographical area may be understood with reference to the foregoing related description. For brevity, details are not described herein.

It should be understood that the two possible implementations are merely examples, and should not constitute any limitation on embodiments of this application.

The geographical area is mainly set to facilitate location point matching performed by the information use apparatus on the second map. This improves matching accuracy and efficiency. The setting of the geographical area needs to ensure that the plurality of location points in the first location point set are all located in the geographical area. In other words, a plurality of location points in the first location point set selected on the first map need to all fall into the geographical area. It is considered that possible differences in drawing specifications between different map vendors. A specific range margin may be further reserved for the geographical area. For example, circles obtained by using each location point in the location point set as a center and using a preset value as a radius fall within the geographical area. For example, the preset value may be predefined. This is not limited in embodiments of this application. It should be understood that the foregoing example of leaving a range margin for the geographical area is merely an example for ease of understanding. This application includes but is not limited thereto.

Optionally, the plurality of location points in the first location point set are location points related to a map element on the first map, and the plurality of location points may be determined based on at least one of the following content: location precision of the plurality of location points and geometric distribution of the plurality of location points.

The location precision of the location point may be defined by the map vendor for each location point on the map when the map vendor builds the map. Higher positioning precision of the location point indicates higher precision of subsequent geometric matching and determining of the location reference point, and higher location precision of the determined target location point. Generally, the information generation apparatus preferably selects a location point with high location precision as a location point in the first location point set.

The location precision of the location point is related to the type of the location point. Herein, the type of the location point includes but is not limited to an end point, an intersection point, a vertex, a change point, a center point, and the like.

The following table lists possible types of location points, definitions, and corresponding priorities of location points.

| Type of the location point | Definition of the location point | Description | Priority |
|---|---|---|---|
| End point | Left and right end points of a centerline of a physical marking line of a stop line of a straight road | Left and right differentiation of the stop line: The left and right end points are distinguished by a driving direction of a road where the stop line is located. A left end point is at a left side of the | First priority |
| | Left and right end points of a centerline of a physical marking line of a stop line at a left-turn waiting area | driving direction, and a right end point is at a right side of the driving direction. | First priority |
| Intersection | Intersection point between the stop line of the straight road and a center line of a | Add number information of the $N^{th}$ lane line<br>Rule: Lane lines are numbered from 1 from left to right along the driving | First priority |

-continued

| Type of the location point | Definition of the location point | Description | Priority |
|---|---|---|---|
| | physical marking line of an N$^{th}$ lane line of a road | direction of the road. A minimum number indicates a left edge of the road, and a maximum number indicates a right edge of the road | |
| | Intersection of the stop line of the left-turn waiting area and the N$^{th}$ lane line | | First priority |
| | Physical line intersection of two road sidelines | None | First priority |
| | Virtual extension line intersection of two road sidelines | None | Third priority |
| | Lane centerline intersection | None | Third priority |
| Vertex | Vertex of an outer polygon of a pedestrian zebra crossing | None | Second priority |
| Change point | Lane line type change point | Add line type information and a change from a line type A to a line type B; Rule: Define a line type, for example, a change from a single solid line A to a single dotted line B | Second priority |
| | Lane line color change point | Add color type information and a change from a color A to a color B; Rule: Define a line color, for example, a change from a white line A to a yellow line B | Second priority |
| | Lane line crossing attribute change point | Add span attribute information and a change from a color A to a color B; Rule: Define a line color, for example, a change from a white line A to a yellow line B | Second priority |
| Midpoint | Ground projection point of a geometric center of an external frame of a traffic sign | Add a sign type number, for example, a speed limit sign number Rule: The external frame is limited to a rectangle, a circle, or a triangle | Second priority |
| | Ground projection point of a geometric center of an external frame of a traffic signal lamp frame | Rule: The external box is limited to a rectangle | Second priority |
| | Geometric center point of an external frame of a traffic marking line | Add a marking type number, for example, a number of a left-turn arrow; Rule: The external frame is limited to a rectangle, a circle, or a triangle | Second priority |

It should be understood that the types and definitions of location points listed in the foregoing table are merely examples. For example, the left end point of the centerline of the physical marking line of the stop line of the straight road may also be derived as a left end point of an inner sideline (near the lane) of the physical marking line of the stop line of the straight road and a left end point of an outer sideline (near an intersection) of the physical marking line of the stop line of the straight road.

It should be further understood that the correspondence between types and definitions, and priorities of location points listed in the foregoing table is merely an example, and should not constitute any limitation on this application. For example, the information generation apparatus may select the first location point set according to the following rule.

Rule 1: Preferably select a general and common element in the drawing or a unique location obtained after this element is further calculated, for example, including but not limited to a lane sideline, a stop line intersection point, or an adjacent road sideline intersection point.

Rule 2: Preferably select a map element whose location is fixed and whose location is not easy to change, for example, including but not limited to a central location point of a traffic light frame, a central location point of a traffic sign, and a location point of a roadside device.

Rule 3: Preferably select a map element with a small location error caused by a difference in drawing specifications of map vendors, for example, including but not limited to a central location point of a traffic light frame or an intersection point between adjacent road sidelines. The central location point of the traffic light frame is a preferred location point because an error is small. The intersection point between adjacent road sidelines is a second best location point because an error is centered due to problems such as a filleted corner. However, a map element with a large error, for example, a crossroad center point, has a large error due to different drawing specifications of map vendors, and is not recommended to be used as a location point in the first location point set.

Based on a priority of each location point, the information generation apparatus may select, from the plurality of location points in the geographical area, a location point with a high priority as the location point in the first location point set. For example, the information generation apparatus may preferably select a location point with a first priority as the location point in the first location point set.

Figure 3:
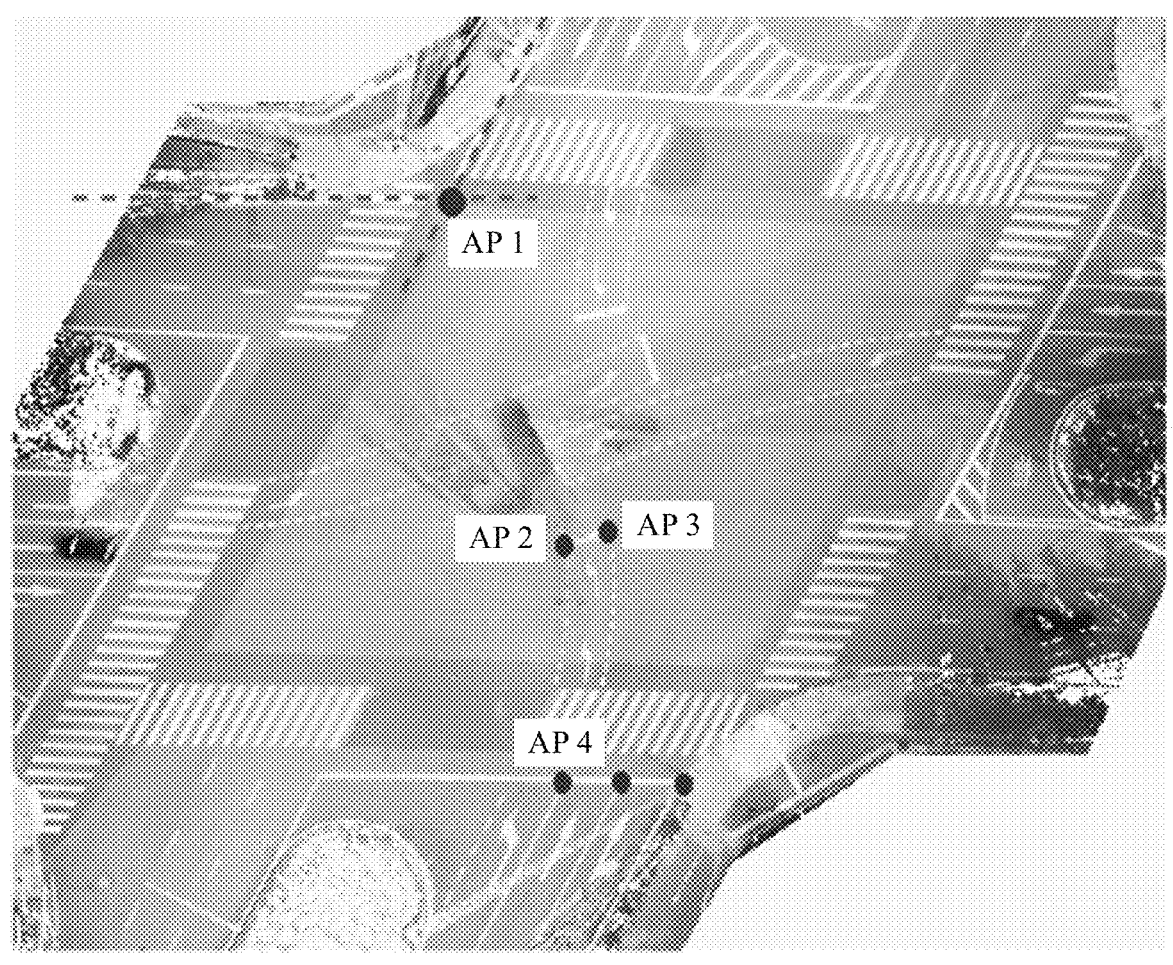
FIG. 3 is a schematic diagram of an example of several location points according to an embodiment of this application.

FIG. 3 shows examples of several location points. The location points shown in FIG. 3 are respectively an intersection point AP 1 between road edge lines, a left end point AP 2 and a right end point AP 3 of a stop line of a turn waiting area, and an intersection point AP 4 between a stop line of a straight carriageway and a lane edge line. The four location points shown in FIG. 2 have high precision, and all may be selected as location points in the first location point set. It should be understood that the location points shown in FIG. 3 are merely examples, and should not constitute any limitation on this application.

It can be learned from the example of the type of the location point that the location point is determined based on the map element, and the type of the location point is related to a type of the map element. The type of the map element may include, for example, but is not limited to, a roadside device, a building, or a traffic sign line. In contrast, precision of the traffic sign line is high, and location precision of a determined location point, for example, an end point or an intersection point that is determined by using the traffic sign line, is also high. Therefore, a priority of the location point that may be selected as the location point in the first location point set is high. However, location precision of a roadside device, a building, or the like is low, and location precision of a determined location point, for example, a center point of a roadside device or a building, is also low. Therefore, a priority of the location point selected as the location point in the first location point set is low. Therefore, to some extent, the location precision of the location points is related to the map element corresponding to the location point. For determining the first location point set, refer to the type of the map element.

In addition, the information generation apparatus may also determine the first location point set based on geometric distribution of the plurality of location points.

The geometric distribution of the plurality of location points may specifically include: whether the distribution of the plurality of location points is extremely centralized or extremely scattered. The geometric shape including the plurality of location points needs to be particular.

Specifically, centralized or dispersed distribution of the plurality of location points may be determined by a relative distance between the plurality of location points. For example, a distance interval may be set, and a distance between any two location points in the plurality of location points needs to fall within a range of the distance interval. For example, if the distance interval is [d1, d2], where d2>d1>0, it indicates that the distance d of the any two location points in the plurality of location points should meet: d1≤d≤d2.

Density of location points varies in geographical areas with different attributes. Here, the attributes of the geographical areas include, but are not limited to, a field, a city, an urban road, a highway, and the like. For example, in areas such as the city, locations are dense. In the field, the highway and other areas, locations are sparse. Therefore, different intervals may be set for different geographical areas. For example, a distance interval set for the city is [d1, d2], and a distance interval set for the field is [d3, d4], where d3>d1, and d4>d2.

The geometric shape including the plurality of location points is specifically a closed shape including combining lines of every two adjacent location points in the plurality of location points. The geometric shape of the plurality of location points needs to be particular, for ease of distinguishing from other location points. If the geometric shape including the plurality of location points is not particular, a second location point set matched when geometric matching is performed on a second map may not be a location point set corresponding to a location of the first location point set on the first map. As a result, a subsequent location reference point is also inaccurately determined. This is unfavorable to a high-precision location expression of the target location point.

For example, if the geometric shape including the plurality of location points is a square, and there are a plurality of groups of location points in a geographical area on the first map, geometric shapes of a same size may be formed. It indicates that the geometric shape including the plurality of location points is not particular. For another example, if the geometric shape including the plurality of location points is an irregular pattern, and a second group of location points that can form the geometric shape of a same size cannot be found in a geographical area on the first map, it indicates that the geometric shape including the plurality of location points is particular.

Therefore, the information generation apparatus may preferably select, as the location points in the first location point set, a plurality of location points whose relative distances fall within a predefined distance interval and whose geometric shape is particular. When determining the first location point set, the information generation apparatus may determine location points in the first location point set based on location precision of the plurality of location points or geometric distribution of the plurality of location points; or may determine location points in the first location point set based on location precision and geometric distribution of the plurality of location points. For example, a location point whose location precision is high, whose geometric shape is particular, and whose relative distance falls within the distance interval is preferably used as the location point in the first location point set.

After determining the geographical area, the first location point set, and the first at least one location point that can be used to determine the location reference point, the information generation apparatus may generate the first information, to indicate the geographical area in the location point set, the relative location between the plurality of location points in the first location point set in the geographical area, and at least one location point in the location point set. The following describes in detail a manner in which the first information indicates the geographical area, the relative location between the plurality of location points in the first location point set in the geographical area, and the first at least one location point in the location point set.

The indication of the geographic area is as follows.

As described above, the geographical area may be a circular area that uses a preselected point as a circle center and a preset value as a search radius, or may be a road segment, a crossroad, or the like. Correspondingly, the first information may indicate the geographical area in a plurality of possible manners.

Figures 4, 5:
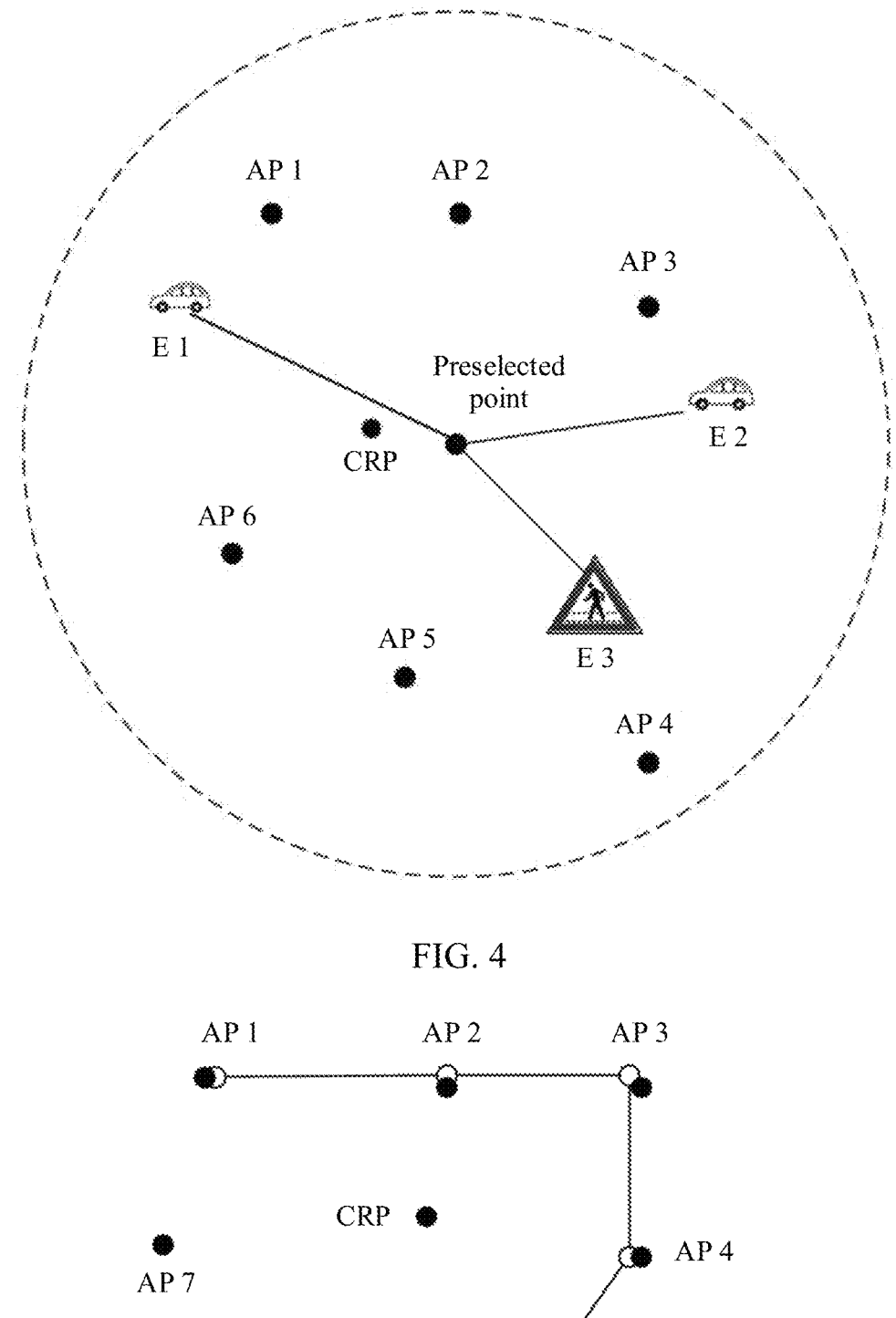
FIG. 4 is a schematic diagram of a geographical area according to an embodiment of this application.
FIG. 5 is a schematic diagram of performing geometric matching based on geometric distribution of a plurality of location points according to an embodiment of this application.

FIG. 4 is a schematic diagram of a geographical area according to an embodiment of this application. As shown in FIG. 4, the geographical area is a circular area. A preselected point is a center of a circle. There are a plurality of location points in the geographic area, such as an AP 1 to an AP 6 in the figure. Three dynamic events can be identified in the geographic area, such as E 1 to E 3 shown in the figure.

Some or all of the AP 1 to the AP 6 may be used to determine a location reference point, for example, a CRP in the figure.

For example, the indication of the geographical area in the first information includes: the preselected point and geometric information. For example, the indication of the prese- lected point may be a longitude and a latitude of the preselected point, and the indication of the geometric infor- mation may be a search radius. Therefore, a circular geo- graphical area may be obtained. For another example, the indication of the preselected point may alternatively be semantic information of the preselected point, for example, a name of an intersection at which the preselected point is located. The indication of the geometric information may alternatively be a search radius, so that a circular geographi- cal area may be obtained; or may be a distance extending in all directions east, south, west, and north, to obtain a square or rectangular geographical area. For another example, the indication of the preselected point may be semantic infor- mation of the preselected point, for example, a road name of a road section on which the preselected point is located. The indication of the geometric information may be at least two of a length occupied by the geographical area in the road section, a start location, and an end location.

In another example, the indication of the geographical area in the first information includes semantic information of the geographical area. For example, the geographical area is a road, and the indication of the geographical area may be a name of the road.

It should be understood that the geographical area may have a plurality of possible shapes, and the geographical area may be defined and indicated in a plurality of possible manners. For brevity, the geographical area is not listed one by one herein.

The indication of the relative location between the plu- rality of location points in the first location point set is as follows.

As described above, the plurality of location points in the first location point set of the information generation appa- ratus may be used for geometric matching on the second map, so that the information use apparatus determines a third at least one location point used to determine the location reference point. Therefore, the information generation appa- ratus needs to indicate the relative location between the plurality of location points in the first location point set, so that the information use apparatus can determine the relative location between the plurality of location points in the first location point set according to the indication, and then, match a second at least one location point corresponding to the plurality of location points on the second map.

In this embodiment of this application, the relative loca- tion between the location points may be expressed by using a Cartesian coordinate system, or may be expressed by using a polar coordinate system. Specifically, when a Cartesian coordinate system is used to express a relative location between location points, information of a location point may include a distance $\Delta x$ of the location point relative to another location point on an x axis, and a distance $\Delta y$ of the location point relative to another location point on a y axis. When a polar coordinate system is used for a coordinate system for expressing the relative location between the location points, information about a location point may include: a distance d and an angle $\varphi$ that point to another location point by using the location point as an origin.

The Cartesian coordinate system may be, for example, an East, North, Up (ENU) Cartesian coordinate system, or may be a North East Down (NED) Cartesian coordinate system. For example, the polar coordinate system may be an East, North, Up (ENU) polar coordinate system, or may be a North East Down (NED) polar coordinate system. This embodiment of this application includes but is not limited to what is described herein.

The indication of the first at least one location point is as follows.

The information generation apparatus may select, from the first location point set, the first at least one location point that can be used to express the location of the location reference point. The information generation apparatus may indicate, in the first information, a number of each of the first at least one location point or other information that can be used to identify the location point, so that the information use apparatus determines the third at least one location point based on the information.

A specific process of determining the third at least one location point by the information use apparatus is described in detail in the following. Details are not described herein.

In step 220, the information generation apparatus sends the first information. Correspondingly, the information use apparatus receives the first information.

For example, the information generation apparatus may send the first information in a unicast scenario or a multicast scenario. In other words, there may be one or more infor- mation use apparatuses that receive the first information. This is not limited in embodiments of this application.

In step 230, the information use apparatus determines a location reference point based on the first information.

As described above, the first information may indicate the geographical area, the relative location between the plurality of location points in the first location point set in the geographical area, and the first at least one location point. Based on this, the information use apparatus may determine a second location point set in a corresponding geographical area on the second map, and further determine a third at least one location point used for a location expression of the location reference point.

Optionally, step 230 may specifically include the follow- ing.

The information use apparatus obtains the second location point set in the geographical area on the second map, where the second location point set includes the second at least one reference point, and the third at least one location point geometrically matches at least a part of the first at least one location point;

determine a third at least one location point based on information that is in the first information and that indicates the first at least one location point, where at least a part of the third at least one location point belongs to the second at least one location point; and determine the location reference point according to the first rule and the third at least one location point.

Because the third at least one location point is determined based on the first at least one location point, the third at least one location point corresponds to the at least a part of the first at least one location point. The information use appa- ratus may determine the location reference point according to the first rule and the third at least one location point. The location reference point is a relative reference for expressing a location on the second map.

Specifically, the second location point set may be obtained by the information use apparatus by performing geometric matching on the second map based on the relative location between the plurality of location points in the first location point set. The so-called geometric matching may specifically mean that a second location point set having a same geo- metric distribution is sought from the second map based on the geometric distribution of the plurality of location points in the first location point set on the first map. The second location point set determined after geometric matching may include a second at least one location point, and the second at least one location point may match all location points in the first location point set, or may match at least some location points. The location point matching herein is based on one location point, and may specifically mean that an absolute coordinate location overlap or an approximate overlap between one location point in the first location point set and one location point in the first location point set.

A type of the coordinate system used for determining geometric distribution of the plurality of location points based on the relative location between the plurality of location points may be predefined, for example, predefined in a protocol, or negotiated by the information generation apparatus and the information use apparatus in advance. Certainly, the coordinate system type may also be one of a plurality of predefined coordinate system types. In this case, the information generation apparatus may further indicate the coordinate system type.

FIG. 5 is a schematic diagram of performing geometric matching based on geometric distribution of a plurality of location points in a first location point set. For ease of distinguishing, a hollow dot represents the plurality of location points in the first location point set, a solid dot represents a plurality of location points on a second map, and a virtual dot represents a virtual location point. As shown in the figure, the first location point set includes an AP 1, an AP 2, an AP 3, an AP 4, an AP 5, and an AP 6. In a geographical area in which the first location point set is located, the following location points are marked: an AP 1, an AP 2, an AP 3, an AP 4, an AP 6, an AP 7, and an AP 8. There are seven location points in total. The AP 1, the AP 2, the AP 3, the AP 4, and the AP 6 are elements marked as location points in both a first map and the second map. The AP 1 in the first location point set approximately overlaps with the AP 1 on the second map. The AP 2 in the first location point set approximately overlaps the AP 2 on the second map. The AP 3 in the first location point set approximately overlaps the AP 3 on the second map. The AP 4 in the first location point set approximately overlaps the AP 4 on the second map. The AP 6 in the first location point set also approximately overlaps the AP 6 on the second map. A geometric shape including the five reference points on the second map is also approximately the same as a geometric shape including the five reference points in the first location point set. Thus, the AP 1, the AP 2, the AP 3, the AP 4, and the AP 6 are geometrically matched between the first map and the second map. The AP 1, the AP 2, the AP 3, the AP 4, and the AP 6 belong to location points in the second location point set.

Then, the information use apparatus may determine a third at least one location point based on a first at least one location point indicated in the first information. As described above, the first information may include a number of the first at least one location point. After determining the second location point set geometrically matching the first location point set, the information use apparatus may correspond the number of the first at least one location point to the location points in a one-to-one manner.

For example, if the number of the first at least one location point that is indicated in the first information is 4, the information use apparatus may determine that the first at least one location point includes the AP 4. It can be learned that if the AP 5 does not belong to the first at least one location point, it indicates that the AP 5 is not used to calculate a location reference point, but is used only for geometric matching. Therefore, although the AP 5 is not marked as a location point on the second map, the information use apparatus does not need to calculate the AP 5. The third at least one location point also includes the AP 4.

Figure 6:
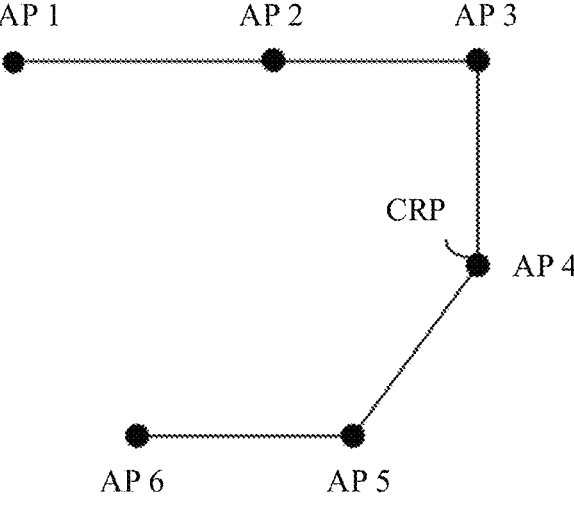
FIG. 6 is a schematic diagram of a first rule used to determine a location reference point according to an embodiment of this application.

After determining the third at least one location point, the information use apparatus may calculate the location reference point according to a first rule. For example, the AP 4 is used as the location reference point. FIG. 6 shows a location reference point CRP determined by the AP 4.

For example, if the number of the first at least one location point indicated in the first information is 1, 2, and 6, the information use apparatus may determine that the first at least one location point includes the AP 1, the AP 2, and the AP 6. It can be learned that if the AP 5 does not belong to the first at least one location point, it indicates that the AP 5 is not used to calculate a location reference point, but is used only for geometric matching. Therefore, although the AP 5 is not marked as a location point on the second map, the information use apparatus does not need to calculate the AP 5. The third at least one location point also includes the AP 1, the AP 2, and the AP 6.

Figure 7:
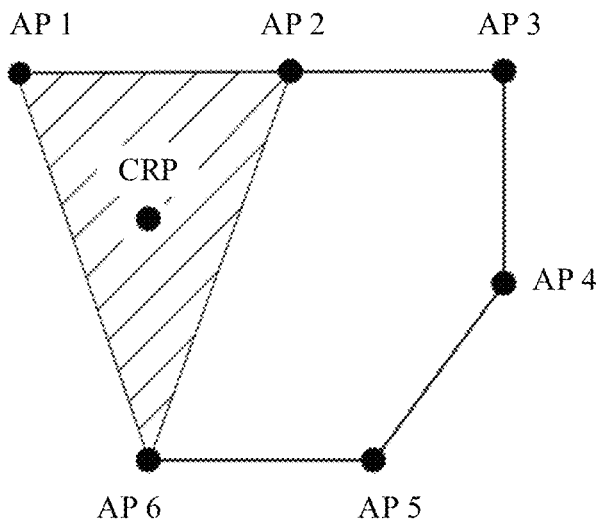
FIG. 7 is a schematic diagram of another first rule used to determine a location reference point according to an embodiment of this application.

After determining the third at least one location point, the information use apparatus may calculate the location reference point according to a first rule. For example, a center of gravity of a geometric shape including AP 1, AP 2, and AP 6 is used as the location reference point. FIG. 7 shows a location reference point CRP determined by the center of gravity of the geometric shape including the AP 1, the AP 2 and the AP 6.

For another example, if the number of the first at least one location point indicated in the first information is 1, 2, 3, and 5, the information use apparatus may determine that the first at least one location point includes the AP 1, the AP 2, the AP 3, and the AP 5. It can be learned that if the AP 5 belongs to one of the first at least one location point, it indicates that the AP 5 is used to calculate the location reference point. However, the AP 5 is not marked as a location point on the second map, and the information use apparatus may first calculate a location of the AP 5 based on a relative location between a plurality of location points in the first location point set. For example, if the first information indicates a location of the AP 5 relative to the AP 4 and a location of the AP 6 relative to the AP 5, the location of the AP 5 may be obtained through calculation. Therefore, the AP 5 obtained through calculation is an example of the virtual reference point. It can be seen that the virtual reference point AP 5 is obtained through calculation based on at least a part of the third at least one reference point. The AP 1, the AP 2, the AP 3, and the AP 5 obtained through calculation all belong to the third at least one reference point, and at least a part of the third at least one reference point belongs to the second at least one reference point.

After determining the third at least one location point, the information use apparatus may calculate the location reference point according to a first rule.

It should be understood that the first rule may be predefined, for example, predefined in a protocol, or pre-negotiated by the information generation apparatus and the information use apparatus. This is not limited in embodiments of this application. The first rule may alternatively be one of a plurality of predefined rules. In this case, the information generation apparatus further needs to indicate the first rule.

To facilitate the location use apparatus to determine the second location point set, and further improve a speed of determining the location reference point, the information generation apparatus may further add other information to the first information.

Optionally, the first information further includes at least one of the following content:

information indicating a quantity of the plurality of location points in the first location point set;

information indicating a type of a coordinate system on which the relative location between the plurality of location points in the first location point set is based;

information indicating a type of each location point in the first location point set;

information indicating location precision of each location point in the first location point set;

information indicating a priority of each location point in the first location point set;

information indicating a first rule, where the first rule is used to determine the location reference point based on the first at least one location point;

information indicating a version of the first information;

information indicating whether location precision of at least some location points in the first location point set is reduced;

information indicating whether location precision of the location reference point determined based on the at least one location point is reduced; and information indicating whether location precision of a target location point is reduced.

The following separately describes the plurality of pieces of information in detail.

The information indicating the quantity of the plurality of location points in the first location point set is as follows.

The quantity of the plurality of location points in the first location point set may be determined by using information that is in the first information and that indicates the plurality of location points, or may be determined by using other information. For example, because the first information may indicate the relative location between the plurality of location points, if the information use apparatus needs to be enabled to be based on the relative location between the plurality of location points that is indicated by the first information, the relative location between the plurality of location points includes at least a relative location between every pair of location points in N−1 pairs of location points, where N is a quantity of location points in the first location point set, and N is a positive integer. For example, if the first location point set includes N and location points whose numbers are respectively 1 to N, location points numbered 1 and 2 are a pair, location points numbered 1 and 3 are a pair, and so on, so that N−1 pairs of location points may be obtained. When the first information indicates the relative location between every pair of location points in the N−1 pairs of location points, the first information also implicitly indicates a quantity N of the location points. For another example, the quantity of the plurality of location points in the first location point set may be predefined, for example, predefined in a protocol, or may be pre-negotiated by the information generation apparatus and the information use apparatus. Therefore, the information that is in the first information and that indicates the quantity of the plurality of location points is optional.

The information indicating the type of the coordinate system on which the relative location between the plurality of location points in the first location point set is based is as follows.

For a description of the coordinate system type, refer to the foregoing related description. For brevity, details are not described herein.

In a possible implementation, the information generation apparatus may indicate the relative location between the plurality of location points based on one of the plurality of predefined coordinate system types. For example, the plurality of predefined coordinate system types may be predefined in a protocol, or may be pre-negotiated by the information generation apparatus and the information use apparatus. This is not limited in this application. The information generation apparatus and the information use apparatus may prestore a correspondence between the plurality of coordinate system types and a plurality of identifiers (for example, indexes or other information that may indicate the coordinate system types). When using a coordinate system type to indicate the relative location, the information generation apparatus may indicate, based on the first information, an identifier corresponding to the coordinate system type. The information use apparatus may determine, based on the coordinate system type corresponding to the identifier and the relative location that is between the plurality of location points in the first location point set and that is indicated by the first information, geometric distribution of the plurality of location points in the first location point set.

In another possible implementation, a coordinate system type indicating the relative location is a predefined coordinate system type. For example, the coordinate system type may be predefined in a protocol, or may be pre-negotiated by the information generation apparatus and the information use apparatus. This is not limited in this application. Therefore, the information that is in the first information and that indicates the coordinate system type is optional.

The information indicating the type of each location point in the first location point set is as follows.

For a description of the type of the location point, refer to the foregoing related description. For brevity, details are not described herein. Different types of location points may be distinguished by using different identifiers. For example, the information generation apparatus may define different numbers for different types of location points, to distinguish the different types of location points. The following table lists type numbers corresponding to the foregoing listed types of location points.

| Type of the location point | Definition of the location point | ID |
|---|---|---|
| End point | Left and right end points of a centerline of a physical marking line of a stop line of a straight road | EP 01, EP 02 |
| | Left and right end points of a centerline of a physical marking line of a stop line at a left-turn waiting area | EP 03, EP 04 |
| Intersection | Intersection point between the stop line of the straight road and a center line of a physical marking line of an $N^{th}$ lane line of a road | CP 01 |

-continued

| Type of the location point | Definition of the location point | ID |
|---|---|---|
| | Intersection of the stop line of the left-turn waiting area and the N$^{th}$ lane line | CP 02 |
| | Physical line intersection of two road sidelines | CP 03 |
| | Virtual extension line intersection of two road sidelines | CP 04 |
| | Lane centerline intersection | CP 05 |
| Vertex | Vertex of an outer polygon of a pedestrian zebra crossing | PV 01 |
| Change point | Lane line type change point | LCP 01 |
| | Lane line color change point | LCP 02 |
| | Lane line crossing attribute change point | LCP 03 |
| Midpoint | Ground projection point of a geometric center of an external frame of a traffic sign | TS 01 |
| | Geometric center point of an external frame of a traffic marking line | TM 01 |
| | Ground projection point of a geometric center of an external frame of a traffic signal lamp frame | TL 01 |

As shown in the table, an EP indicates an end point (EP), and a number following the EP may be used to distinguish different end points. A CP indicates a cross over point (CP), and a number following the CP may be used to distinguish different intersection points. A PV indicates a polygon vertex (PV), and a number following the PV may be used for different vertices. An LCP indicates a line change point (LCP), and a number following the LCP is used to distinguish different line change points. A TS indicates a traffic sign (TS), and a number following the TS is used to distinguish different traffic signs. A TM indicates a traffic marking (TM), and a number following the TM is used to distinguish different traffic markings. A TL indicates a traffic light (TL), and a number following the TL is used to distinguish different traffic lights. It should be understood that numbers following the foregoing acronyms and abbreviations may be numbered starting from 01, or may be numbered starting from another value. This is not limited in this application. It should be further understood that a correspondence between a location point and a number described above is merely a possible example, and should not constitute any limitation on this application. This application does not limit a representation form of the correspondence, and does not limit specific content of the correspondence, provided that the information generation apparatus and the information use apparatus generate and parse the first information based on a same correspondence between a location point and a number.

The information generation apparatus may indicate, based on the first information, types of the plurality of location points in the first location point set, and the information use apparatus may determine a plurality of candidate location points in a geographical area on the second map based on the types indicated by the first information. The candidate location point is a location point of a same type as the plurality of location points in the first location point set. In this way, a calculation amount for determining the second location point set by the information use apparatus can be greatly reduced, so that the information use apparatus can quickly complete geometric matching and determine the second location point set. On the other hand, compared with the location points in the first location point set, the plurality of candidate location points determined based on the type have a higher probability of redundancy. When location points that match all the location points in the first location point set are not found on the second map, a redundant location point may be used to calculate a virtual location point, to improve matching reliability.

The information indicating location precision of each location point in the first location point set is as follows.

When building a map, a map provider may divide location points on the map into different precision, and the different precision may be distinguished by using different identifiers, for example, may be distinguished by using different values. For ease of distinguishing from the following priority, a value used to identify location precision may be referred to as a precision level. Higher precision indicates a higher precision level, and lower precision indicates a lower precision level. Alternatively, lower precision indicates a higher precision level, and lower precision indicates a higher precision level. This is not limited in embodiments of this application. It should be understood that identifying different precision by using different values is merely a possible implementation, and different precision may alternatively be identified in another manner. This application includes but is not limited thereto.

When determining the second location point set, the information use apparatus may preferably select a location point with high location precision as the location point in the second location point set. For example, if different location precision is identified by using different values, and higher location precision indicates a higher precision level, the information use apparatus may, for example, first select a location point with a highest precision level, and then select a location point with a second highest precision level, and so on until the second location point set is determined.

It should be understood that a same location precision may also be defined for all location points on the map. In this case, the information that is in the first information and that indicates the location precision of the location point is optional.

The information indicating a priority of each location point in the first location point set is as follows.

Similar to precision, different priorities may also be distinguished by using different identifiers, for example, may be distinguished by using different values. For ease of distinguishing from the location precision, a value used to identify a priority may be referred to as a priority value. A higher priority value indicates a higher priority, and a lower priority value indicates a lower priority. Alternatively, a lower priority value indicates a higher priority, and a higher priority value indicates a lower priority. This is not limited in embodiments of this application. It should be understood that identifying different priorities by using different values is only a possible implementation, and different priorities may alternatively be identified in another manner. This application includes but is not limited thereto.

When determining the second location point set, the information use apparatus may preferably select a location point with a high priority as the location point in the second location point set. For example, if different priorities are identified by using different values, and a higher priority indicates a higher priority value, the information use apparatus may, for example, first select a location point with a highest priority value, and then select a location point with a second highest priority value, and so on until the second location point set is determined.

It should be understood that the priority and the location precision may be used together, or may be used separately. This is not limited in embodiments of this application. For example, if the priority and the location precision are combined, when determining the second location point set, the information use apparatus may preferably select a location point with a high priority and high location precision as the location point in the second location point set. It may be understood that, because the priority is usually related to the location precision, a location point with high location precision usually corresponds to a high priority.

It should be further understood that a same priority may be defined for all location points on the map. In this case, the information that is in the first information and that indicates the priority of the location point is optional. Alternatively, a definition of the priority of each location point on the map may be related to the location precision, where the location precision is high, the priority is high, and the location precision is low, and the priority is low. In this case, either the information that is in the first information and that indicates the location precision of the location point or the information that is in the first information and that indicates the priority of the location point may be selected.

In addition, the information use apparatus may alternatively directly perform geometric matching on the relative location of the plurality of location points in the first location point set based on the first information, without referring to other information such as precision and priority. Therefore, the information that is in the first information and that indicates the location precision of the location point and the information that is in the first information and that indicates the priority of the location point are optional.

In a possible implementation, high or low location precision and high or low priority may be separately measured by using different thresholds. For example, the location precision is identified by using a precision level, and corresponds to a first threshold. If the precision level is higher than the first threshold, it is considered that the location precision is high. The priority is identified by using a priority value, and corresponds to a second threshold. If the priority is higher than the second threshold, it is considered that the priority is high. It should be understood that the first threshold and the second threshold may be independent of each other.

It is assumed that a higher location level indicates higher location precision, and a higher priority value indicates a higher priority. The information use apparatus may select, from the plurality of candidate location points, a location point whose precision level is higher than the first threshold and/or whose priority value is higher than the second threshold as the location point in the second location point set.

It should be further understood that a location point whose location precision is higher than the threshold or whose priority is higher than the threshold is selected from the plurality of candidate location points as a location point in the second location point set. It does not mean that the information use apparatus may select only the location point whose location precision is higher than the threshold or whose priority is higher than the threshold as the location point in the second location point set. For example, when no location point whose location precision is higher than the threshold or whose priority is higher than the threshold can match the location point in the first location point set, the information use apparatus may alternatively select a location point whose location precision is lower than or equal to the first threshold, or a location point whose priority is lower than or equal to the second threshold as a location point in the second location point set. In other words, the information use apparatus may preferably select, from the plurality of candidate location points, a location point whose location precision is higher than the threshold and/or whose priority is higher than the threshold as the location point in the second location point set. The information indicating the first rule is as follows.

The first rule may specifically be a rule used to determine the location reference point based on the first at least one location point. For example, the first rule may be that a location point in the first at least one location point is used as the location reference point, or may be a calculation manner of obtaining the location reference point through calculation based on at least one location point in the at least one location point.

In a possible implementation, the information generation apparatus and the information use apparatus may prestore a correspondence between a plurality of rules and a plurality of identifiers (for example, indexes or other information that can indicate the coordinate system types). When using one of the rules as the first rule to express a location of the location reference point, the information generation apparatus may indicate, based on the first information, an identifier corresponding to the first rule.

In another possible implementation, the first rule used to determine the location reference point is a predefined rule. For example, the first rule may be predefined in a protocol, or may be pre-negotiated by the information generation apparatus and the information use apparatus. This is not limited in this application. Therefore, the information that is in the first information and that indicates the first rule is optional.

FIG. 6 and FIG. 7 are schematic diagrams of a first rule used to determine a location reference point. As shown in the figure, the first location point set in a geographical area includes location points AP 1, AP 2, AP 3, AP 4, AP 5, and AP 6. As shown in FIG. 7, if the first rule is that a center of gravity of a geometric shape including APs numbered 1, 2, and 6 is used as a location reference point, the center of gravity may be determined as the location reference point based on the geometric shape including the AP 1, the AP 2, and the AP 6. The AP 1, the AP 2, and the AP 6 are examples of the first at least one reference point. As shown in FIG. 6, if the first rule is that a reference point numbered 4 is used as the location reference point, an AP 4 may be used as the location reference point, and the AP 4 is another example of the first at least one reference point.

The information indicating a version of the first information is as follows.

The version of the first information may alternatively be understood as a version of the first location point set or a version of the first at least one location point. Because the first location point set and the first at least one location point may change, for example, may change with a location change of the information generation apparatus, the relative location between the plurality of location points in the first location point set may be re-indicated based on the first information. In other words, if the version of the first information changes, it may indicate that the first location point set changes, that is, a relative location of the first at least one location point changes.

The information indicating the version of the first information may be, for example, version information (for example, a version number), a time stamp, an update indication flag bit, or other information that may indicate whether the version is updated. This is not limited in embodiments of this application.

It may be understood that the information generation apparatus may repeatedly send the first information, so that all information use apparatuses that receive the first information can determine the location reference point based on the most recently received first information. Therefore, the information that is in the first information and that indicates the version of the first information is optional.

The information indicating the update time of the first information is as follows.

When the version of the first information is updated, an update time may be further indicated, so that when receiving a plurality of pieces of first information, the information use apparatus determines, based on the update time, the first information that is recently received, accurately performs geometric matching, and further accurately determines the location reference point.

For example, if the information use apparatus is a moving vehicle, and if the vehicle is in the geographical area indicated by the first information in a running process, after receiving the first information, the vehicle may check the version and the update time of the first information, and selectively use the first information based on a check result. For example, if the version of the first information does not change, the currently stored location reference point is directly determined as the location reference point, and the received first information may be discarded without performing other processing. If the version of the first information changes, geometric matching is performed by using the currently received first information. It should be understood that the location reference point currently stored in the information use apparatus is determined based on previously received first information of a latest version.

The information indicating the update time of the first information may be, for example, a time stamp. If the information that is in the first information and that indicates the version of the first information is also a time stamp, it is equivalent that both the version of the first information and the update time of the first information are indicated by using the time stamp. In other words, the information that is in the first information and that indicates the version of the first information and the information that indicates the update time of the first information may be the same information.

It may be understood that the information generation apparatus may repeatedly send the first information, and each time after receiving new first information, the information receiving apparatus may discard previously received first information, and determine the location reference point based on the newly received first information. Therefore, the information that is in the first information and that indicates the update time of the first information is also optional.

The information indicating whether location precision of at least some location points in the first location point set is reduced, and the information indicating whether location precision of the location reference point is reduced are as follows.

If location precision of some or all of the location points in the first location point set is reduced, location precision of the determined location reference point is also reduced accordingly. Therefore, the information indicating whether the location precision of the at least some location points in the first location point set is reduced and the information indicating whether the location precision of the location reference point is reduced may be considered to be equivalent and replaceable.

The information indicating whether precision of the target location point is reduced is as follows. In some cases, the location precision of the target location point may be also reduced. For example, if there are few location points near a highway on a map, a sufficient quantity of location points may not be found for geometric matching in a close range near a vehicle running on the highway or a roadside device around the highway, and even one location point may not be found for geometric matching. For example, when a distance between the information generation apparatus and a nearest location point is greater than or equal to a preset threshold, a location point in a distant range may be selected for geometric matching. For another example, there are few location points near a target location point, and distribution is extremely scattered or extremely concentrated. As a result, a geometric matching degree is low. All of these reasons may cause the location precision of the target location point to be reduced. Therefore, the information generation apparatus may indicate, in the first information, information about whether precision of the target location point is reduced.

The information use apparatus can make a corresponding decision based on the information about whether the location precision is reduced. For example, if the location precision is not reduced, it may be considered that the precision of the target location point determined accordingly is high, and a high-level unmanned driving mode may be used, for example, an L4-level unmanned driving mode (namely, highly autonomous driving), or the location precision may be used for short-distance perception and decision-making. If the location precision is reduced, it may be considered that precision of the target location point determined accordingly is also reduced, and a lower-level unmanned driving mode, for example, an L2-level unmanned driving mode (namely, partial autonomous driving), may be used, or a work, for example, path planning, may be performed based on the target location point.

A location overlap between a location point in the third at least one location point and a location point in the first at least one location point is only an overlap within a preset range, that is, location precision of the location point in the third at least one location point may not be high. As a result, precision of the determined location reference point is not high. Therefore, the information use apparatus may further optimize the third at least one location point. A possible manner of optimizing the third at least one location point is performing error compensation on the third at least one location point, so that a location point obtained after compensation can better match the first at least one location point.

Specifically, the information use apparatus may perform, according to a second rule, error compensation on the location point that is in the third at least one location point and that is successfully matched. The second rule may be, for example, that offset of the two matched location points are greater than or equal to a preset threshold (for example, denoted as a first preset threshold). If the offset of the two matched location points are greater than or equal to the first preset threshold, error compensation needs to be performed. If the offset of the two matched location points are less than the preset threshold, error compensation does not need to be performed. For another example, the second rule may be that an error level is greater than or equal to a preset threshold (for example, denoted as a second preset threshold). The error level is related to the offset of two matched location points, and a correspondence between offsets and error levels may be defined. When an error level of the two matched location points is greater than or equal to the second preset threshold, error compensation needs to be performed.

The error compensation may include compensation based on location points and compensation based on geometric distribution.

Because different map vendors may define a same location point differently, a matched location point between the first map and the second map may have a specific error. The information use apparatus may perform error compensation for the location point in the third at least one location point based on the difference in the definition of the location points.

For example, if the third at least one location point includes the location point AP 1 shown in FIG. 2, the location point AP 1 may be defined on the first map as an intersection point between an outer sideline of a lane edge line and an outer sideline of a stop line, and may be defined on the second map as an intersection point between an inner sideline of a lane edge line and an inner sideline of a stop line. Therefore, error compensation may be performed by using an estimated line width, and the location of the location point may be adjusted.

In addition to the possible errors caused by different definitions of location points, there may also be errors in geometric matching. After the error compensation for each location point in the third at least one location point is completed, if a geometric matching degree is still not high, the information use apparatus may perform an overall fine-tuning, for example, an operation like translation and rotation, on the third at least one location point, so that location points with high location precision can overlap between the first map and the second map to a maximum extent.

For example, the first at least one location point includes four location points, and the third at least one location point on the second map also includes four location points. However, a matching degree of the four location points between the first map and the second map is not high. If the four location points include an AP 1 and an AP 2 with high location precision and an AP 3 and an AP 4 with low location precision, the information use apparatus may perform overall fine-tuning on the four location points, so that the AP 1 and the AP 2 on the second map can overlap the AP 1 and the AP 2 on the first map to a maximum extent.

Error compensation is performed on the location point in the third at least one location point, so that a degree of matching between the third at least one location point and the first at least one location point is higher. Therefore, the error compensation process is an optimization process of the third at least one location point. Therefore, the determined location reference point is more accurate, to facilitate a high-precision location expression of the target location point.

To facilitate differentiation, the third at least one location point obtained after optimization is denoted herein as a fourth at least one location point. It should be understood that optimizing the location points in the third at least one location point may be optimizing all location points in the third at least one location point, or may be optimizing some location points. This is not limited in this application. However, it should be noted that the fourth at least one location point is specifically all of the third at least one location point obtained after optimization, and is not limited to an optimized location point. In other words, determining the location reference point according to the first rule and the fourth at least one location point may mean determining the location reference point according to the first rule and the third at least one location point obtained after optimization.

When identifying a dynamic event, the information generation apparatus may generate and send, to the information use apparatus, second information that may indicate a location of the target location point relative to the location reference point, so that the information use apparatus determines the location of the target location point based on the second information.

Optionally, the method further includes: step 240: The information generation apparatus sends the second information, where the second information indicates the location of the target location point relative to the location reference point. Correspondingly, the information use apparatus receives the second information.

Step 250: The information use apparatus determines the location of the target location point based on the location reference point and the second information.

The second information in step 240 and the first information in step 220 may be carried in one message for sending. In this case, step 220 and step 240 may be combined into one sending step. The second information in step 240 and the first information in step 220 may also be carried in different messages for sending. In this case, step 220 and step 240 may be two sending steps.

If the first information and the second information are carried in different messages for sending, the information generation apparatus may periodically and repeatedly send the first information, to indicate a newly determined first location point set and a location reference point to the information use apparatus. Certainly, the information generation apparatus may send the first information each time before it is identified that the dynamic event needs to indicate the target location point. This is not limited in embodiments of this application.

The information generation apparatus may send the first information in a broadcast manner. In this way, each information use apparatus may receive the first information, and may determine, based on version update information in the first information received each time, whether to update the location reference point. When identifying the dynamic event, the information generation apparatus may generate and send the second information, to indicate the location of the target location point of the dynamic event relative to the location reference point.

Alternatively, the information generation apparatus may send the first information in a unicast manner. After receiving the first information, the information use apparatus may send an acknowledgment message to the information generation apparatus, to indicate successful reception of the first information. Therefore, the information generation apparatus may stop sending the first information, and may continue to send the second information.

For example, the roadside device may send the first information to the terminal device in a broadcast manner. In another example, the roadside device may send the first information to the cloud device in a unicast manner. In another example, the terminal device may send the first information to another terminal device in a broadcast manner, and the another terminal device may determine, by itself, whether to receive the first information, or determine, by itself, whether to enable this service.

If the first information and the second information are carried in a same message for sending, the information generation apparatus may generate the first information and the second information for the dynamic event when identifying the dynamic event, to notify the information use apparatus of the target location point of the dynamic event in time. It is convenient for the information use apparatus to respond in time.

It should be understood that, for ease of understanding, the foregoing merely provides several possible cases in which the first information and the second information are carried in different messages for sending or carried in a same message for sending. However, these possible cases are merely examples, and should not constitute any limitation on embodiments of this application.

In step 250, because the second information indicates the location of the target location point relative to the location reference point, the information use apparatus may determine the location of the target location point based on the second information and the predetermined location reference point.

Based on the foregoing technical solution, by indicating the relative location of the plurality of location points in a geographical area on the first map, the information generation apparatus may be configured to perform geometric matching on the second map based on the relative location of the plurality of location points, to obtain, on the second map, location points matching the plurality of location points. Further, the location reference point may be determined on the second map based on the at least one of the plurality of location points. Because each map vendor deploys location points on the map, and the location points are usually common map elements with fixed locations on the map, even if drawing specifications are different, an error introduced by the difference in the drawing specifications is small and precision is high. An expression of the subsequent target location point can also achieve high precision. Therefore, poor compatibility across map vendors is taken into account while high-precision positioning is realized.

The foregoing describes in detail the methods provided in embodiments of this application with reference to FIG. 2 to FIG. 7. An apparatus provided in embodiments of this application is described below in detail with reference to FIG. 8 to FIG. 11.

Figure 8:
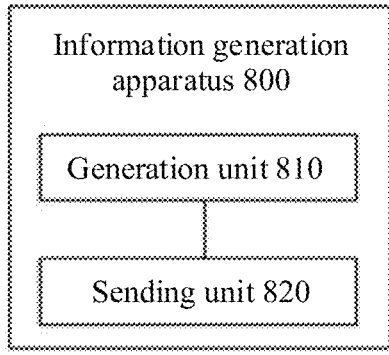
FIG. 8 is a schematic block diagram of an information generation apparatus according to an embodiment of this application.

FIG. 8 is a schematic block diagram of an information generation apparatus according to an embodiment of this application. As shown in FIG. 8, the information generation apparatus 800 may include a generation unit 810 and a sending unit 820. Each unit in the apparatus 800 may be configured to implement a corresponding procedure performed by the information generation apparatus in the method 200 shown in FIG. 2. For example, the generation unit 810 may be configured to perform step 210 in the method 200, and the sending unit 820 may be configured to perform step 220 and step 240 in the method 200.

Specifically, the generation unit 810 may be configured to generate first information, where the first information indicates a geographical area, a relative location between a plurality of location points in a location point set in the geographical area, and at least one location point that belongs to the location point set, and the at least one location point is used to determine a location reference point. The sending unit 820 is configured to send the first information.

Optionally, the first information further includes at least one of the following content: information indicating a quantity of the plurality of location points; information indicating a type of a coordinate system on which the relative location is based; information indicating a type of each location point in the plurality of location points; information indicating location precision of each location point in the plurality of location points; information indicating a priority of each location point in the plurality of location points; information indicating a rule, where the rule is used to determine the location reference point based on the at least one location point; information indicating a version of the first information; information indicating an update time of the first information; information indicating whether location precision of at least some of the plurality of location points is reduced; information indicating whether location precision of the location reference point determined based on the at least one location point is reduced; information indicating whether location precision of a target location point is reduced; and information indicating whether location precision of the location reference point determined based on the at least one location point is reduced.

Optionally, the sending unit 820 may be further configured to send second information, where the second information indicates a location of the target location point relative to the location reference point.

Optionally, the apparatus 800 further includes a receiving unit, configured to: after the sending unit 820 sends the first information, receive an acknowledgment message, where the acknowledgment message indicates that the first information is successfully received. The sending unit 820 is specifically configured to send the second information based on reception of the acknowledgment message.

It should be understood that the division into units in embodiments of this application is an example, and is merely logical function division. There may be another division manner in actual implementation. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

Figure 9:
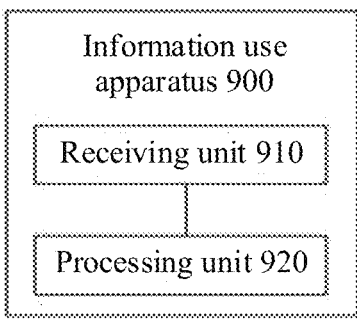
FIG. 9 is a schematic block diagram of an information use apparatus according to an embodiment of this application.

FIG. 9 is a schematic block diagram of an information use apparatus according to an embodiment of this application. As shown in FIG. 9, the information use apparatus 900 may include a receiving unit 910 and a processing unit 920. Optionally, units in the apparatus 900 may be configured to implement a corresponding procedure performed by the information use apparatus in the method 200 shown in FIG. 2. For example, the receiving unit 910 may be configured to perform step 220 and step 240 in the method 200, and the processing unit 920 may be configured to perform step 230 and step 250 in the method 200.

Specifically, the receiving unit 910 may be configured to receive first information, where the first information indicates a geographical area, a relative location between a plurality of location points in a first location point set in the geographical area on a first map, and a first at least one location point that belongs to the first location point set. The processing unit 920 may be configured to determine a location reference point based on the first information.

Optionally, the processing unit 920 may be specifically configured to determine, based on update indication information included in the first information, that the location reference point is not updated; and determine a currently stored location reference point as the location reference point.

Optionally, the processing unit 920 may be specifically configured to obtain a second location point set in the geographical area on a second map, where the second location point set includes a second at least one location point, and the second at least one location point geometrically matches at least a part of the first at least one location point; determine a third at least one location point based on information that is in the first information and that indicates the first at least one location point, where at least a part of the third at least one location point belongs to the second at least one location point; and determine the location reference point according to a first rule and the third at least one location point, where the location reference point is a relative reference for expressing a location on the second map, and the second map is different from the first map.

Optionally, the processing unit 920 may be further configured to obtain a plurality of candidate location points in the geographical area on the second map based on information that is in the first information and that indicates the type of each location point in the plurality of location points; and determine the second location point set from the plurality of candidate location points based on the relative location between the plurality of location points in the first location point set.

Optionally, the processing unit 920 may be specifically configured to preferably select, from the plurality of candidate location points, a location point whose location precision is higher than the threshold or whose priority is higher than the threshold as the location point in the second location point set.

Optionally, the processing unit 920 may be specifically configured to determine a location and confidence of the location reference point based on the first information, where the confidence is related to at least a geometric matching degree, and the geometric matching degree is a degree of geometric matching between the first at least one location point and the second at least one location point.

Optionally, the processing unit 920 may be specifically configured to: optimize a location point in the third at least one location point according to a second rule, to obtain a fourth at least one location point, and determine the location reference point according to the first rule and the fourth at least one location point.

Optionally, the processing unit 920 may be specifically configured to determine that the version of the first information is updated; and determine the location reference point based on the first information.

Optionally, the receiving unit 910 may be further configured to receive second information, where the second information indicates a location of the target location point relative to the location reference point; determine the location of the target location point based on the location reference point and the second information.

Optionally, the apparatus 900 further includes a sending unit, where the sending unit may be configured to send the acknowledgment message, and the acknowledgment message indicates that the first information is successfully received.

It should be understood that the division into units in embodiments of this application is an example, and is merely logical function division. There may be another division manner in actual implementation. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

Figure 10:
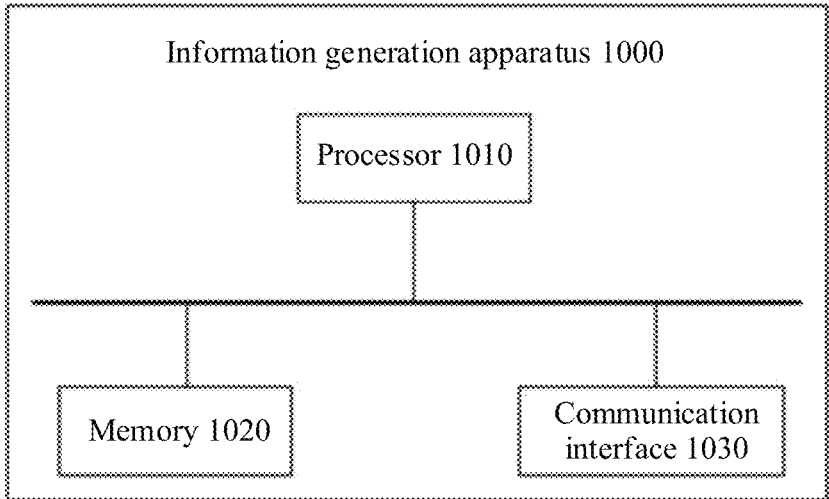
FIG. 10 is another schematic block diagram of an information generation apparatus according to an embodiment of this application.

FIG. 10 is another schematic block diagram of an information generation apparatus according to an embodiment of this application. The information generation apparatus 1000 may be configured to implement a function of the information generation apparatus in the foregoing method. The information generation apparatus 1000 may be a chip system. In this embodiment of this application, the chip system may include a chip, or may include a chip and another discrete component.

As shown in FIG. 10, the apparatus 1000 may include at least one processor 1010, configured to implement the function of the information generation apparatus in the method provided in embodiments of this application.

For example, when the apparatus 1000 is configured to implement a function of the information generation apparatus in the method provided in embodiments of this application, the processor 1010 may be configured to: generate first information, where the first information indicates a geographical area, a relative location between a plurality of location points in a location point set in the geographical area, and at least one location point that belongs to the location point set, and the at least one location point is used to determine a location reference point; and send the first information. For details, refer to detailed descriptions in the method examples. Details are not described herein.

The apparatus 1000 may further include at least one memory 1020, configured to store program instructions and/or data. The memory 1020 is coupled to the processor 1010. The coupling in this embodiment of this application may be an indirect coupling or a communication connection between apparatuses, units, or modules in an electrical form, a mechanical form, or another form, and is used for information exchange between the apparatuses, the units, or the modules. The processor 1010 may cooperate with the memory 1020. The processor 1010 may execute the program instruction stored in the memory 1020. At least one of the at least one memory may be included in the processor.

The apparatus 1000 may further include a communication interface 1030, configured to communicate with another device through a transmission medium, so that the apparatus 1000 may communicate with the another device. For example, when the apparatus 1000 is configured to implement a function of the information generation apparatus in the method provided in embodiments of this application, the another device may be an information use apparatus. The communication interface 1030 may be, for example, a transceiver, an interface, a bus, a circuit, or an apparatus that can implement a transceiver function. The processor 1010 may send and receive data and/or information by using the communication interface 1030, and is configured to implement the method performed by the information generation apparatus in the embodiment corresponding to FIG. 2.

A specific connection medium between the processor 1010, the memory 1020, and the communication interface 1030 is not limited in embodiments of this application. In this embodiment of this application, in FIG. 10, the processor 1010, the memory 1020, and the communication interface 1030 are connected through a bus. The bus is represented by a thick line in FIG. 10, and a connection manner between other components is merely described as an example, and is not limited thereto. The bus may be classified into an address bus, a data bus, a control bus, and the like. For ease of representation, only one thick line is for representing the bus in FIG. 10, but this does not mean that there is only one bus or only one type of bus.

Figure 11:
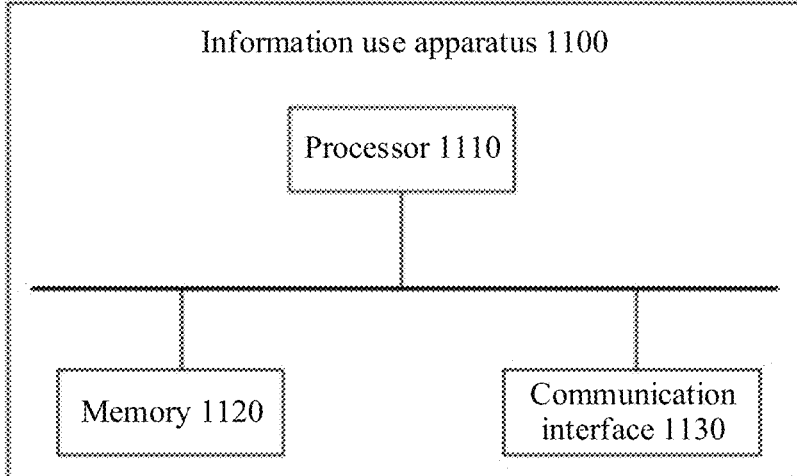
FIG. 11 is another schematic block diagram of an information use apparatus according to an embodiment of this application.

FIG. 11 is another schematic block diagram of an information use apparatus according to an embodiment of this application. The information use apparatus 1100 may be configured to implement a function of the information use apparatus in the foregoing method. The information use apparatus 1100 may be a chip system. In this embodiment of this application, the chip system may include a chip, or may include a chip and another discrete component.

As shown in FIG. 11, the apparatus 1100 may include at least one processor 1110, configured to implement a function of the information use apparatus in the method provided in embodiments of this application.

For example, when the apparatus 1100 is configured to implement the function of the information use apparatus in the method provided in embodiments of this application, the processor 1110 may be configured to receive the first information, where the first information indicates a geographical area, a relative location between a plurality of location points in a first location point set in the geographical area on a first map, and a first at least one location point that belongs to the first location point set; and determine a location reference point based on the first information.

The apparatus 1100 may further include at least one memory 1120, configured to store program instructions and/or data. The memory 1120 is coupled to the processor 1110. The coupling in this embodiment of this application may be an indirect coupling or a communication connection between apparatuses, units, or modules in an electrical form, a mechanical form, or another form, and is used for information exchange between the apparatuses, the units, or the modules. The processor 1110 may cooperate with the memory 1120. The processor 1110 may execute the program instructions stored in the memory 1120. At least one of the at least one memory may be included in the processor.

The apparatus 1100 may further include a communication interface 1130, configured to communicate with another device through a transmission medium, so that the apparatus 1100 may communicate with the another device. For example, when the apparatus 1100 is configured to implement the function of the information use apparatus in the method provided in embodiments of this application, the another device may be an information generation apparatus. The communication interface 1130 may be, for example, a transceiver, an interface, a bus, a circuit, or an apparatus that can implement a transceiver function. The processor 1110 may send and receive data and/or information by using the communication interface 1130, and is configured to implement the method performed by the information use apparatus in the embodiment corresponding to FIG. 2.

A specific connection medium between the processor 1110, the memory 1120, and the communication interface 1130 is not limited in embodiments of this application. In this embodiment of this application, in FIG. 11, the processor 1110, the memory 1120, and the communication interface 1130 are connected through a bus. The bus is represented by a thick line in FIG. 11, and a connection manner between other components is merely described as an example, and is not limited thereto. The bus may be classified into an address bus, a data bus, a control bus, and the like. For ease of representation, only one thick line is for representing the bus in FIG. 10, but this does not mean that there is only one bus or only one type of bus.

It should be understood that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished through a hardware decoding processor, or may be executed and accomplished by using a combination of hardware and software modules in the decoding processor. A software module may be located in a mature storage medium in the art, like a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

This application further provides a vehicle. The vehicle includes the foregoing information generation apparatus 800 or the foregoing information generation apparatus 1000, or the vehicle includes the foregoing information use apparatus 900 or the foregoing information use apparatus 1100.

This application further provides a computer program product. The computer program product includes a computer program (which may also be referred to as code or instructions). When the computer program is run, this computer is enabled to perform the method performed by the information generation apparatus or the method performed by the information use apparatus in embodiments shown in FIG. 2.

This application further provides a computer-readable storage medium. The computer-readable storage medium stores a computer program (which may also be referred to as code or instructions). When the computer program is run, the computer is enabled to perform the method performed by the information generation apparatus or the method performed by the information use apparatus in the embodiment shown in FIG. 2.

This application further provides a map. The map includes the foregoing first information and the foregoing second information.

This application further provides a computer-readable storage medium, and the computer-readable storage medium stores the foregoing map.

The terms such as "unit" and "module" used in this specification may indicate computer-related entities, hardware, firmware, combinations of hardware and software, software, or software being executed.

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit.

In the foregoing embodiments, all or some of the functions of the function units may be implemented by using software, hardware, firmware, or any combination thereof. When software is used to implement embodiments, all or a part of embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or may be a data storage device, like a server or a data center that integrates one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing storage medium includes any medium that can store program code, like a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for information generation, comprising:
at least one processor; and
one or more memories coupled to the at least one processor and storing programming instructions for execution by the at least one processor to:
generate first information, wherein the first information indicates a geographical area, a relative location between a plurality of location points in a location point set in the geographical area on a first map, and at least one location point that belongs to the location point set, and the at least one location point is for determining a location reference point on a second map, wherein the location reference point is a relative reference for expressing a location on the second map, and the second map is different from the first map, and the first information further comprises at least one of:
information indicating location precision of the at least one location point in the plurality of location points;
information indicating a priority of the at least one location point in the plurality of location points; or
information indicating a rule for determining the location reference point based on the at least one location point; and
send the first information.

2. The apparatus according to claim 1, wherein the first information further comprises at least one of the following content:
information indicating a quantity of the plurality of location points;

information indicating a type of a coordinate system on which the relative location is based;

information indicating a type of each location point in the plurality of location points;

information indicating a version of the first information;

information indicating an update time of the first information;

information indicating whether location precision of at least some of the plurality of location points is reduced;

information indicating whether location precision of the location reference point determined based on the at least one location point is reduced; or information indicating whether location precision of a target location point is reduced.

3. The apparatus according to claim 1, wherein the programming instructions are for execution by the at least one processor to:

send second information, wherein the second information indicates a location of a target location point relative to the location reference point.

4. The apparatus according to claim 3, wherein the first information and the second information are carried in different messages, and the programming instructions are for execution by the at least one processor to:

receive an acknowledgment message, wherein the acknowledgment message indicates that the first information is successfully received, and wherein the second information is sent based on reception of the acknowledgment message.

5. The apparatus according to claim 3, wherein the first information and the second information are carried in a same message.

6. The apparatus according to claim 1, wherein the first information is periodically repeated information.

7. The apparatus according to claim 1, wherein the plurality of location points are determined based on at least one of the following content:

location precision of the plurality of location points; and geometric distribution of the plurality of location points.

8. The apparatus according to claim 1, wherein a geometric shape including the plurality of location points is particular such that no other group of location points that form the geometric shape of a same size is found in the geographic area on the first map, wherein the geometric shape including the plurality of location points is a closed shape including combining lines of every two adjacent location points in the plurality of location points.

9. An apparatus for information use, comprising:

at least one processor; and one or more memories coupled to the at least one processor and storing programming instructions for execution by the at least one processor to:

receive first information, wherein the first information indicates a geographical area, a relative location between a plurality of location points in a first location point set in the geographical area on a first map, at least one location point that belongs to the first location point set, and the at least one location point is for determining a location reference point, wherein the location reference point is a relative reference for expressing a location on a second map, and the second map is different from the first map, and the first information further comprises at least one of:

information indicating location precision of the at least one location point in the plurality of location points;

information indicating a priority of the at least one location point in the plurality of location points; or information indicating a rule for determining the location reference point based on the at least one location point; and determine the location reference point based on the first information.

10. The apparatus according to claim 9, wherein the first information further comprises at least one of the following content:

information indicating a quantity of the plurality of location points;

information indicating a type of a coordinate system on which the relative location is based;

information indicating a type of each location point in the plurality of location points;

information indicating a version of the first information;

information indicating an update time of the first information;

information indicating whether location precision of at least some of the plurality of location points is reduced;

information indicating whether location precision of the location reference point determined based on the at least one location point is reduced; or information indicating whether location precision of a target location point is reduced.

11. The apparatus according to claim 9, wherein the programming instructions are for execution by the at least one processor to:

determine, based on update indication information comprised in the first information, that the location reference point is not updated; and determine a currently stored location reference point as the location reference point.

12. The apparatus according to claim 9, wherein the programming instructions are for execution by the at least one processor to:

obtain a second location point set in the geographical area on the second map, wherein the second location point set comprises at least one second location point, and the at least one second location point geometrically matches at least a part of the at least one location point;

determine at least one third location point based on information that is in the first information and that indicates the at least one location point, wherein at least a part of the at least one third location point belongs to the at least one second location point; and determine the location reference point according to a first rule and the at least one third location point.

13. The apparatus according to claim 12, wherein the at least one third location point comprises a virtual location point, and the virtual location point is obtained based on a relative location between the at least a part of the at least one third location point and the plurality of location points.

14. The apparatus according to claim 12, wherein the programming instructions are for execution by the at least one processor to:

obtain a plurality of candidate location points in the geographical area on the second map based on the information that is in the first information and that indicates a type of each location point in the plurality of location points; and select the second location point set from the plurality of candidate location points based on the relative location between the plurality of location points in the first location point set.

15. The apparatus according to claim 14, wherein the programming instructions are for execution by the at least one processor to:

select, from the plurality of candidate location points, a location point whose location precision is higher than a threshold or whose priority is higher than a threshold as a location point in the second location point set.

16. The apparatus according to claim 12, wherein the programming instructions are for execution by the at least one processor to:

determine a location and confidence of the location reference point based on the first information, wherein the confidence is related to at least a geometric matching degree, and the geometric matching degree is a degree of geometric matching between the at least one location point and the at least one second location point.

17. The apparatus according to claim 12, wherein the programming instructions are for execution by the at least one processor to:

optimize at least a part of the at least one third location point according to a second rule, to obtain at least one fourth location point; and determine the location reference point according to the first rule and the at least one fourth location point.

18. The apparatus according to claim 9, wherein the programming instructions are for execution by the at least one processor to:

determine that a version of the first information is updated; and determine the location reference point based on the first information.

19. The apparatus according to claim 9, wherein the programming instructions are for execution by the at least one processor to:

receive second information, wherein the second information indicates a location of a target location point relative to the location reference point; and determine the location of the target location point based on the location reference point and the second information.

20. The apparatus according to claim 9, wherein the programming instructions are for execution by the at least one processor to:

send an acknowledgment message, wherein the acknowledgment message indicates that the first information is successfully received.

21. A method for information generation, comprising:

generating first information, wherein the first information indicates a geographical area, a relative location between a plurality of location points in a location point set in the geographical area on a first map, and at least one location point that belongs to the location point set, and the at least one location point is for determining a location reference point on a second map, wherein the location reference point is a relative reference for expressing a location on the second map, and the second map is different from the first map, and the first information further comprises at least one of:

information indicating location precision of the at least one location point in the plurality of location points;

information indicating a priority of the at least one location point in the plurality of location points; or information indicating a rule for determining the location reference point based on the at least one location point; and sending the first information.

22. The method according to claim 21, wherein the first information further comprises at least one of the following content:

information indicating a quantity of the plurality of location points;

information indicating a type of a coordinate system on which the relative location is based;

information indicating a type of each location point in the plurality of location points;

information indicating a version of the first information;

information indicating an update time of the first information;

information indicating whether location precision of at least some of the plurality of location points is reduced;

information indicating whether location precision of the location reference point determined based on the at least one location point is reduced; or information indicating whether location precision of a target location point is reduced.

23. The method according to claim 21, wherein the method further comprises:

sending second information, wherein the second information indicates a location of a target location point relative to the location reference point.

24. The method according to claim 21, wherein the first information is periodically repeated information.

25. The method according to claim 21, wherein the plurality of location points are determined based on at least one of the following content:

location precision of the plurality of location points; and geometric distribution of the plurality of location points.

26. A method for information use, comprising:

receiving first information, wherein the first information indicates a geographical area, a relative location between a plurality of location points in a first location point set in the geographical area on a first map, at least one location point that belongs to the first location point set, and the at least one location point is for determining a location reference point on a second map, wherein the location reference point is a relative reference for expressing a location on the second map, and the second map is different from the first map, and the first information further comprises at least one of:

information indicating location precision of the at least one location point in the plurality of location points;

information indicating a priority of the at least one location point in the plurality of location points; or information indicating a rule for determining the location reference point based on the at least one location point; and determining the location reference point based on the first information.

27. The method according to claim 26, wherein the determining the location reference point based on the first information comprises:

determining, based on update indication information comprised in the first information, that the location reference point is not updated; and determining a currently stored location reference point as the location reference point.

28. The method according to claim 26, wherein the determining the location reference point based on the first information comprises:

obtaining a second location point set in the geographical area on the second map, wherein the second location point set comprises at least one second location point, and the at least one second location point geometrically matches at least a part of the at least one location point;

determining at least one third location point based on information that is in the first information and that indicates the at least one location point, wherein at least a part of the at least one third location point belongs to the at least one second location point; and determining the location reference point according to a first rule and the at least one third location point.

29. The method according to claim 26, wherein the determining the location reference point based on the first information comprises:

determining that a version of the first information is updated; and determining the location reference point based on the first information.

30. The method according to claim 26, wherein the method further comprises:

receiving second information, wherein the second information indicates a location of a target location point relative to the location reference point; and determining the location of the target location point based on the location reference point and the second information.

* * * * *